US006521716B1

(12) United States Patent
Leake

(10) Patent No.: US 6,521,716 B1
(45) Date of Patent: Feb. 18, 2003

(54) COATING, ADHESIVE AND SEALANT COMPOSITIONS

(75) Inventor: Jonathan Stuart Leake, Dorset (GB)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/381,246

(22) PCT Filed: Mar. 17, 1998

(86) PCT No.: PCT/GB98/00790

§ 371 (c)(1),
(2), (4) Date: Feb. 25, 2000

(87) PCT Pub. No.: WO98/41561

PCT Pub. Date: Sep. 24, 1998

(30) Foreign Application Priority Data

Mar. 18, 1997 (GB) ............................................. 9705518

(51) Int. Cl.7 ................... C09D 167/06; C09D 177/00; C09J 167/06; C09J 177/00
(52) U.S. Cl. ................... 525/421; 525/420; 525/425; 525/437; 525/447; 528/289; 528/293; 528/303; 528/306; 528/345
(58) Field of Search ................ 525/420, 421, 525/425, 447, 437; 528/289, 293, 303, 306, 345

(56) References Cited

U.S. PATENT DOCUMENTS

| | | | |
|---|---|---|---|
| 4,089,845 A | 5/1978 | Haug et al. ............... 260/78 A |
| 4,122,074 A | 10/1978 | Pepe et al. ..................... 526/26 |
| 4,161,580 A | 7/1979 | Haug et al. .................. 528/322 |
| 4,315,860 A | 2/1982 | Simpson .................. 260/245.7 |
| 4,408,018 A | 10/1983 | Bartman et al. ............. 525/300 |
| 4,588,807 A | 5/1986 | Scholl et al. ................ 528/272 |
| 4,602,061 A | 7/1986 | Akkerman .................... 525/10 |
| 4,730,033 A | 3/1988 | Horley et al. ............... 528/288 |
| 4,871,822 A | 10/1989 | Brindopke et al. .......... 526/271 |
| 5,084,536 A | 1/1992 | Brindopke et al. ....... 526/218.1 |
| 5,159,024 A | * 10/1992 | Brindopke .................. 525/301 |
| 5,169,979 A | 12/1992 | Kubillis et al. .............. 560/176 |
| 5,416,136 A | 5/1995 | Konzmann et al. .......... 523/414 |
| 5,426,156 A | 6/1995 | Bederke et al. .............. 525/426 |
| 5,451,653 A | 9/1995 | Chen et al. ................... 525/374 |
| 5,496,896 A | 3/1996 | Alfons ......................... 525/74 |

FOREIGN PATENT DOCUMENTS

| | | | |
|---|---|---|---|
| EP | 0287842 | 10/1988 | ......... C08F/299/02 |
| EP | 0376590 | 7/1990 | ......... C07C/255/19 |
| EP | 0580328 | 1/1994 | ......... C08F/299/04 |
| EP | 0584916 | 3/1994 | ......... C09D/157/10 |
| EP | 0599478 | 6/1994 | ......... C09D/157/00 |
| EP | 0634425 | 1/1995 | ............. C08F/8/32 |
| EP | 0651023 | 5/1995 | ......... C08L/101/00 |
| EP | 0697444 | 2/1996 | ............. C09D/4/06 |
| EP | 0737726 | 10/1996 | ............. C09D/4/06 |
| GB | 2048913 | 12/1980 | ........... C08G/16/00 |

OTHER PUBLICATIONS

*Journal of Chemical Soc.* (C), A.K. Kiang, et al., "Reactions to Acetonadicarboxylic Anhydride (Tetrahydropyrantrione) and its Mono–and Di–acetyl Derivatives with Amines", Singapore, (1971) pp. 2721–2726.

C.F.H. Allen and F.W. Spangler, Organic Synthesis, (1955), Coll. vol. 3, pp. 377–379.

*Journal of Polymer Science*, A. Ravve, et al., "Synthesis of Photocrosslinkable Polyesters by the Knoevenagel Reaction", Illinois, (1973), vol. 11, pp. 1733–1752.

\* cited by examiner

Primary Examiner—Patricia A. Short
(74) Attorney, Agent, or Firm—Joan M. McGillycuddy

(57) ABSTRACT

A coating, adhesive or sealant composition curable by Michael reaction comprises (A) a Michael acceptor which is a compound or polymer containing at least two activated olefinic double bonds and (B) a Michael donor which is a compound or polymer containing at least two nucleophilic groups. The double bonds of the Michael acceptor (A) are activated by two adjacent electron-withdrawing groups. Alternatively or additionally, the Michael donor (B) contains β-ketoamide, enamine carboxylate, enamine amide, pyrazolone, isoxazolone, hydantoin, rhodanine, thio-substituted unsaturated ester, thio-substituted lactone or phosphonite or phosphinite ester groups. More rapid ambient temperature curing is achieved.

6 Claims, No Drawings

COATING, ADHESIVE AND SEALANT COMPOSITIONS

FIELD OF THE INVENTION

This invention relates to coating, adhesive and sealant compositions curable by Michael reaction, that is by addition of an anion derived from a nucleophilic group, for example a carbanion, to an activated carbon-carbon double bond. This involves reaction between (A) a Michael acceptor which is a compound or polymer generally containing at least two activated olefinic double bonds and (B) a Michael donor which is a compound or polymer containing at least one and generally containing at least two nucleophilic groups.

BACKGROUND ART

Coating compositions curable by Michael reaction are disclosed in U.S. Pat. No. 4,408,018, GB-A-2048913, U.S. Pat. Nos. 4,602,061, 5,084,536, 5,169,979, EP-A-697444 and U.S. Pat. No. 4,730,013. In general, the Michael donor in these compositions is a compound having at least two activated methylene groups, for example acetoacetate groups, or a polyamine or polythiol.

U.S. Pat. No. 4,588,807 describes a benzylidenemalonic acid polyester and its use for the UV stabilisation of thermoplastics.

EP-A-599478 describes a coating or impregnating composition comprising an aqueous dispersion of a vinyl addition polymer and a reactive coalescent of the formula:

 or

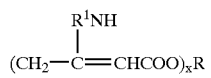

where R is an organic radical of valency x=1–6 and $R^1$ is H or alkyl.

U.S. Pat. No. 5,451,653 describes improved crosslinking systems for coatings and adhesives comprising a crosslinkable polymer having activated ketomethylene (e.g. acetoacetate) groups and an aldimine curing agent.

U.S. Pat. No. 5,426,156 describes a two-component binder system comprising a CH-acid component that is a polymer with at least two enamine functions in the molecule and a compound containing at least two alpha, beta-unsaturated ester or amide groups.

Coating and Sealant compositions curing by Michael reaction have several advantages. Liquid polymers and oligomers can be crosslinked to form tough hard coatings, so that the coating composition need have little or no volatile organic solvent to achieve a viscosity suitable for spray application. The reactive groups involved in curing are less of a health and/or safety risk than most crosslinkable reactive groups. The cured materials are generally resistant to hydrolysis and degradation, particularly in the case where the Michael donor is an activated methylene group since the new bonds formed on crosslinking are C—C bonds. Ester linkages, such as acetoacetates, acquire greater steric hindrance and hence hydrolysis resistance as a result of the Michael crosslinking reaction. The Michael reaction is beneficial for water-borne systems because it involves the transfer of hydrogen (as a proton) from a more electronegative element (with potential for hydrogen bonding) to a less electronegative element, carbon, which is not capable of hydrogen bonding. The reaction mixture therefore becomes less polar during curing, and in a coating the affinity for water should consequently decrease as curing progresses. In some cases, a water-soluble polymer/crosslinker system can be transformed into a water-resistant cured coating upon crosslinking. There is, however, a need for Michael curing coatings which cure more rapidly, particularly at ambient temperature, and/or are capable of curing without the need for powerful alkaline catalysts.

DISCLOSURE OF INVENTION

According to one aspect of the invention, a coating, adhesive or sealant composition curable by Michael reaction comprises (A) a Michael acceptor which is a compound or polymer containing at least two activated olefinic double bonds and (B) a Michael donor which is a compound or polymer containing at least two nucleophilic groups and is characterised in that the Michael acceptor (A) is a polymer having repeating units of the formula:

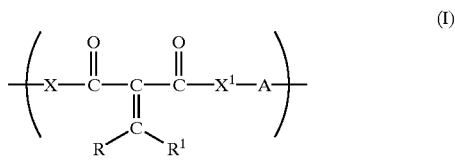 (I)

where R is hydrogen or an alkyl or aryl group which is optionally substituted and $R^1$ is hydrogen or an alkyl group which is optionally substituted;

X and $X^1$ are each selected from an oxygen atom and a group of the formula

where $R^1$ is hydrogen or an alkyl or aryl group which is optionally substituted; and A is a divalent organic group.

The alkyl groups mentioned above and throughout the remainder of the text may for example have up to 12 carbon atoms, preferably up to 4 or 6 carbon atoms, for example methyl or ethyl. The aryl groups mentioned above and throughout the remainder of the text may for example have 6 to 12 carbon atoms and are preferably phenyl. The alkylene and arylene groups referred to below and throughout the remainder of the text may be similarly defined except for being divalent instead of monovalent. Substituents for all such groups which may be mentioned are halogen, hydroxyl and other non-reactive groups. The divalent organic group A is linked to $X^1$ through a carbon atom. It may for example be an alkylene or arylene group which is optionally substituted.

According to another aspect of the invention a coating, adhesive or sealant composition curable by Michael reaction comprises (A) a Michael acceptor which is a compound or polymer containing at least two activated olefinic double bonds and (B) a Michael donor which is a compound or polymer containing at least two nucleophilic groups and is characterised in that the Michael acceptor (A) is a compound or polymer containing at least two groups of the formula:

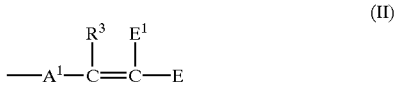

where $A^1$ is a divalent organic group or a linking bond whereby the group (II) is linked to the compound or polymer (A);

$R^3$ is hydrogen or an alkyl group; and

E and $E^1$ are each electron-withdrawing groups independently selected from groups of the formula:

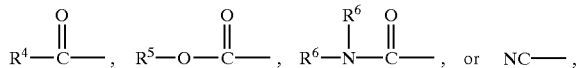

where $R^4$ and $R^5$ each represent an optionally substituted alkyl or aryl group and each group $R^6$ represents a hydrogen atom or an optionally substituted alkyl or aryl group.

According to another aspect of the invention, a coating, adhesive or sealant composition curable by Michael reaction comprises (A) a Michael acceptor which is a compound or polymer containing at least two activated olefinic double bonds and (B) a Michael donor which is a compound or polymer containing at least two nucleophilic groups and is characterised in that the Michael acceptor (A) is a compound or polymer containing at least two groups of the formula:

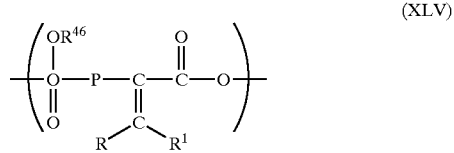

where R and $R^1$ are defined as in formula (I) above and $R^{46}$ is an alkyl or aryl group which is optionally substituted.

We have found that the polymers of formula (I), (II) or (XLV), in which the olefinic C=C bond is doubly activated by having two electron-withdrawing groups on one of the carbon atoms at the C=C bond, are substantially more reactive in Michael curing systems than are polymers containing acrylate or methacrylate ester groups.

According to another aspect of the invention, a coating, adhesive or sealant composition curable by Michael reaction comprises (A) a Michael acceptor which is a compound or polymer containing at least two activated double bonds and (B) a Michael donor which is a compound or polymer containing at least two nucleophilic groups and is characterised in that the Michael acceptor (A) is a compound or polymer containing at least two doubly activated olefinic groups of the formula:

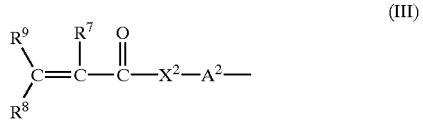

where $R^7$ is an electron-withdrawing group, $R^8$ and $R^9$ are each independently selected from hydrogen, alkyl, which is optionally substituted, and aryl, which is optionally substituted; $X^2$ is an —O— or

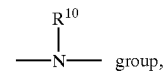

where $R^{10}$ is hydrogen or an alkyl group, and $A^2$ is an optionally substituted alkylene group linking the doubly activated olefinic group to the compound or polymer (A); and in that the nucleophilic groups of the Michael donor (B) are beta-ketoamide groups of the formula:

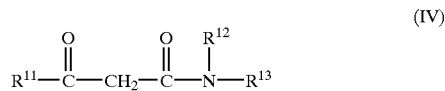

where at least one of the groups $R^{11}$, $R^{12}$ and $R^{13}$ is an optionally substituted alkylene or arylene radical whereby the ketoamide group is linked to the compound or polymer (B) and the remaining groups $R^{11}$, $R^{12}$ and $R^{13}$ are in the case of $R^{11}$ an optionally substituted alkyl or aryl group and in the case of $R^{12}$ and $R^{13}$ a hydrogen atom or an optionally substituted alkyl or aryl group, provided that at least one of $R^{12}$ and $R^{13}$ is other than aryl and arylene; or (ii) enamine beta-carboxylate groups of the formula:

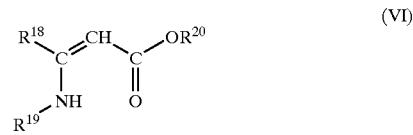

where at least one of the groups $R^{18}$, $R^{19}$ and $R^{20}$ is an optionally substituted alkylene radical or $R^{18}$ is an optionally substituted arylene radical, whereby the enamine beta-carboxylate group is linked to the compound or polymer (B), and of the remaining groups $R^{18}$ is a hydrogen atom or an optionally substituted alkyl or aryl group, $R^{19}$ is a hydrogen atom or an optionally substituted alkyl group and $R^{20}$ is an optionally substituted alkyl group.

The use of beta-ketoamide groups in Michael donors for curing coating systems is mentioned in U.S. Pat. Nos. 4,871,822, 5,084,536 and EP-A-697444 but is not suggested as being particularly useful in conjunction with Michael acceptors which contain doubly activated olefinic groups. We have found that the combination of a Michael donor having beta-ketoamide groups with a Michael acceptor having doubly activated olefinic groups provides a coating composition curable at ambient temperature many times faster than known Michael curing coatings, for example about 100 or even 1000 times faster than similar coatings based on acetoacetate groups and acrylate groups.

The use of enamine carboxylate groups in Michael donors is mentioned in U.S. Pat. No. 5,426,156 but is not suggested as being particularly useful in conjunction with Michael acceptors which contain doubly activated olefinic groups. We have found that the combination of a Michael donor having enamine beta-carboxylate groups with a Michael acceptor having doubly activated olefinic groups provides a coating composition which cures rapidly at ambient temperature without need for a basic catalyst.

According to a further aspect of the invention a coating, adhesive or sealant composition curable by Michael reaction comprises (A) a Michael acceptor which is a compound or polymer containing at least two activated olefinic double bonds and (B) a Michael donor which is a compound or polymer containing at least two nucleophilic groups and is characterised in that the nucleophilic groups of the Michael donor (B) are groups selected from:

(i) enamine amide groups of the formula:

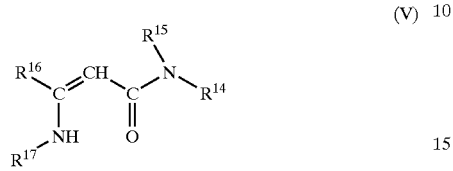

(V)

where at least one of the groups $R^{14}$, $R^{15}$, $R^{16}$ and $R^{17}$ is an optionally substituted alkylene radical or one of the groups $R^{14}$, $R^{15}$ and $R^{16}$ is an optionally substituted arylene radical, whereby the enamine amide group is linked to the compound or polymer (B), and of the remaining groups $R^{14}$, $R^{15}$ and $R^{16}$ are hydrogen atoms or optionally substituted alkyl or aryl groups, provided that $R^{14}$ and $R^{15}$ are not both aryl or arylene groups, and $R^{17}$ is a hydrogen atom or an optionally substituted alkyl group;

(ii) heterocyclic groups of the formula:

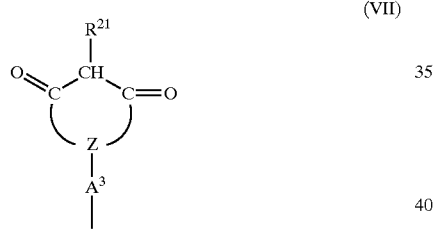

(VII)

where $R^{21}$ is a hydrogen atom or an optionally substituted alkyl group, Z is a trivalent radical completing a heterocyclic 5- to 7-membered ring and $A^3$ is a radical of valency at least 2 or a linking bond whereby the heterocyclic group is linked to the compound or polymer (B);

(iii) heterocyclic groups of the formula:

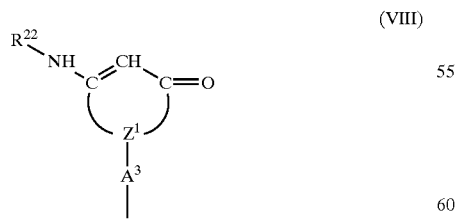

(VIII)

where $R^{22}$ is a hydrogen atom or an optionally substituted alkyl group, $Z^1$ is a trivalent radical completing a heterocyclic 5- to 7-membered ring and $A^3$ is defined as above;

(iv) heterocyclic groups of the formula:

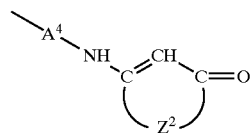

(IX)

where $Z^2$ is a divalent radical completing a heterocyclic 5- to 7-membered ring and $A^4$ is an optionally substituted alkylene radical whereby the heterocyclic group is linked to the compound or polymer (B);

(v) heterocyclic groups of the formula:

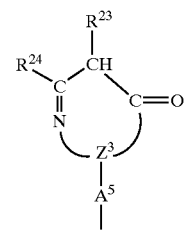

(X)

where $R^{23}$ is a hydrogen atom or an optionally substituted alkyl group; $R^{24}$ is a hydrogen atom or an optionally substituted alkyl or aryl group; $Z^3$ is a trivalent radical completing a 5- to 7-membered heterocyclic ring and $A^5$ is a radical of valency at least 2 or a linking bond whereby the heterocyclic group is linked to the compound or polymer (B);

(vi) heterocyclic groups of the formula:

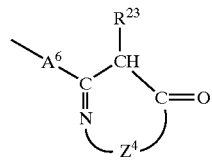

(XI)

where $R^{23}$ is a hydrogen atom or an optionally substituted alkyl group; $Z^4$ is a divalent radical completing a 5- to 7-membered heterocyclic ring and $A^6$ is an optionally substituted alkylene or arylene radical or a linking bond whereby the heterocyclic group is linked to the compound or polymer (B);

(vii) heterocyclic groups of the formula:

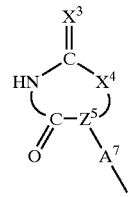

(XII)

where $X^3$ is an oxygen or sulphur atom;

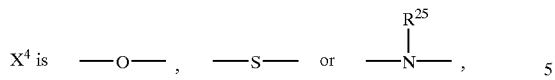

where $R^{25}$ is a hydrogen atom or an optionally substituted alkyl group; $Z^5$ is a trivalent radical completing a 5- to 7-membered heterocyclic ring; and $A^7$ is a radical of valency at least 2 or a linking bond whereby the heterocyclic group is linked to the compound or polymer (B);

(viii) heterocyclic groups of the formula:

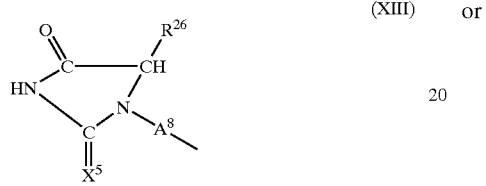
(XIII)

where $X^5$ is an oxygen or sulphur atom; $R^{26}$ is a hydrogen atom or an optionally substituted alkyl group; and $A^8$ is an optionally substituted alkylene group whereby the heterocyclic group is linked to the compound or polymer (B);

(ix) thio-containing ester or lactone groups of the formula:

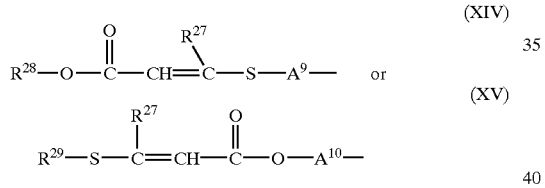
(XIV)

or (XV)

where $R^{27}$ is a hydrogen atom or an optionally substituted alkyl or aryl group and $R^{28}$ is an optionally substituted alkyl group or $R^{27}$ and $R^{28}$ together form an optionally substituted alkylene linkage completing a lactone ring and $A^9$ is an optionally substituted alkylene or arylene group whereby the thio-containing ester or lactone group is linked to the compound or polymer (B), or $R^{29}$ is an optionally substituted alkyl or aryl group and $A^{10}$ is an optionally substituted alkylene or arylene group whereby the thio-containing ester group is linked to the compound or polymer (B);

(x) phosphonite esters of the formula:

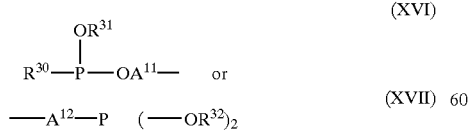
(XVI)

or (XVII)

where $R^{30}$ is an optionally substituted alkyl or aryl group, $R^{31}$ is an optionally substituted alkyl group and $A^{11}$ is an optionally substituted alkylene group whereby the phosphonite ester group is linked to the compound or polymer (B) or $R^{31}$ and $A^{11}$ are joined to form an optionally substituted alkylene linkage which completes a cyclic phosphonite ester ring, which alkylene linkage is substituted by a chemical linkage to the compound or polymer (B); $A^{12}$ is an optionally substituted alkylene or arylene group whereby the phosphonite ester group is linked to the compound or polymer (B) and the groups $R^{32}$ are each optionally substituted alkyl groups which are the same or different or are joined to form a heterocyclic ring; and (xi) phosphinite esters of the formula:

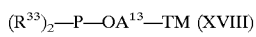
(XVIII)

or

(XIX)

where each group $R^{33}$, which may be the same or different, is an optionally substituted alkyl or aryl group; $A^{13}$ as an optionally substituted alkylene group whereby the phosphinite ester group is linked to the compound or polymer (B) or one of the groups $R^{33}$ and $A^{13}$ are joined to form an optionally substituted alkylene linkage which completes a cyclic phosphinite ester ring, which alkylene linkage is substituted by a chemical linkage to the compound or polymer (B); $A^{14}$ is an optionally substituted alkylene or arylene group whereby the phosphinite ester group is linked to the compound or polymer (B); $R^{34}$ is an optionally substituted alkyl group and $R^{35}$ is an optionally substituted alkyl or aryl group or $R^{34}$ and $R^{35}$ are joined to form a heterocyclic ring.

We have found that Michael donors containing groups of any of the formulae (IV) to (XIX) are substantially more active in Michael curing coatings than are the acetoacetates described in U.S. Pat. No. 4,408,018 and GB-A-2048913, the malonates described in U.S. Pat. No. 4602061 or the amines described in U.S. Pat. No. 4,730,033 and are capable of giving more rapid curing at ambient temperature and/or curing with less powerful alkaline catalysts. No base catalyst is required when using Michael donors containing thio-containing ester or lactone groups of formula (XIV) or (XV) or phosphonite or phosphinite esters of formulae (XVI) to (XIX).

The polymer having repeating units of formula (I) can for example be a polyester in which the groups X and XI represent oxygen atoms or a polyamide in which the groups X and $X^1$ represent groups of the formula:

where $R^2$ is hydrogen or an alkyl group. Polyesters can for example be synthesised from a di(lower alkyl) malonate such as dimethyl malonate by either of two different routes, as illustrated in the following reaction scheme:

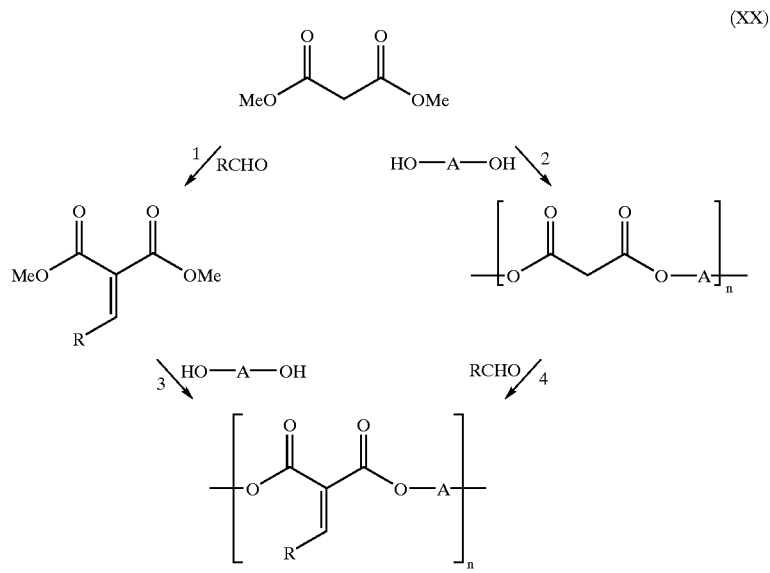

(XX)

in which Me=methyl, R is a monovalent aliphatic or aromatic group or hydrogen and A is a divalent aliphatic group.

The first route (1 and 3) uses the synthesis of dimethyl alkylidenemalonate from dimethyl malonate and an aldehyde RCHO by the Knoevenagel reaction (Reaction 1). Reaction 3 gives the polyester oligomer by a transesterification polymerisation reaction of the alkylidenemalonate with a diol HO—A—OH.

The second route (2 and 4) uses the synthesis of a malonate polyester oligomer from dimethyl malonate and a diol (Reaction 2). Reaction of the oligomer with an aldehyde by the Knoevenagel reaction produces the doubly activated double bond on each malonate site (Reaction 4). Malonyl di(acid chloride) can be used in place of the dialkyl malonate ester in Reaction 2.

The Knoevenagel reaction can for example be carried out by the use of Dean and Stark apparatus where the starting aldehyde and malonate compound are refluxed in toluene with a base catalyst such as piperidine or morpholine and an acid catalyst such as benzoic acid or acetic acid. Water, the reaction co-product, is separated and collected in the Dean and Stark graduated tube. An alternative procedure uses a titanium tetrachloride tetrahydrofuran complex and pyridine or N-methylmorpholine as the respective acid and base catalysts. This reaction is carried out under nitrogen at around 0° C. with stirring. These lower temperature reaction conditions are preferred, especially for lower boiling aldehydes.

The transesterification reaction (Reactions 2 and 3) is carried out at temperatures of up to 190° C. with vigorous stirring. A nitrogen purge can be used to facilitate distillation of the methanol condensate. A Dean and Stark apparatus can be used to collect the condensate, the amount of methanol collected being indicative of the progress of the reaction. n-Butyltin chloride dihydroxide or titanium tetraisopropoxide can be used as catalyst for the reaction. The degree of polymerisation of the polyester oligomer is dependent on the relative quantities of dimethyl malonate or dimethyl alkylidenemalonate and diol. For example, oligomers synthesised by using a mole ratio of 10:9 malonate to diol would at completion give a theoretical degree of polymerisation n of 9 and in practice give values of n of 6 to 9. Polymers having 3 to 20, particularly 5 to 10, activated C═C bonds and a molecular weight in the range 600 to 5000 are generally suitable as Michael acceptors in coating and sealant compositions according to the invention.

For use in coatings, the reactive oligomer preferably has a low Tg (−30° C. to −80° C.) and a viscosity of less than 1.5 Pa s (15 poise).

Suitable aldehydes for use in the Knoevenagel reaction (1 or 4) are acetaldehyde (R=CH$_3$) formaldehyde (R=H) butyraldehyde (R=n-C$_3$H$_7$), isobutyraldehyde (R=i-C$_2$H$_7$), isovaleraldehyde (R=i-C$_4$H$_9$) and benzaldehyde (R=C$_5$H$_5$). The diol HO—A—OH is preferably a straight-chain alkanediol HO(CH$_2$)$_m$OH where m=2–10, for example propane-1,3-diol, butane-1,4-diol, hexane-1,6-diol or decane-1,10-diol, although branched diols such as propylene glycol or neopentyl glycol or ether-containing diols such as diethylene glycol can be used.

The polymer having repeating units of formula I can alternatively be a polyamide. For example, a polyamide having repeating units of the formula:

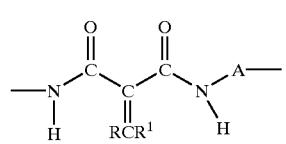

(XXI)

can be prepared by reaction of a di(lower alkyl) malonate or malonyl di(acid chloride) with a di(primary amine) H$_2$NANH$_2$ to form a polyamide followed by Knoevenagel reaction with an aldehyde RCHO or ketone RCOR$^1$. Alternatively, a diisocyanate OCN-J-NCO can be heated with malonic acid to form a polyamide

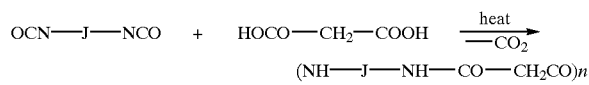

(NH—J—NH—CO—CH$_2$CO)n which can undergo a Knoevenagel reaction to introduce the activated C═C bond. In the latter reaction, the steps can be carried out in reverse order, that is malonic acid can be reacted with an aldehyde or ketone in a Knoevenagel reaction and the resulting unsaturated dicarboxylic acid can be heated with a diisocyanate to produce a polyamide. Polyamides possess considerable hydrolytic stability, as well as good resistance to other substances such as hydraulic fluid. Advantage may also be taken of the affinity of amides for water; water can be used as a solvent, diluent or plasticiser in coating or adhesive compositions based on a polyamide having repeating units of formula XXI.

The compound or polymer containing at least two doubly activated olefinic groups of formula (II) can be prepared from a compound containing at least two glycidyl groups, such as the diglycidyl ether of bisphenol A or a glycidyl acrylate polymer, by reaction with a hydroxy-substituted aldehyde such as p-hydroxybenzaldehyde, which can optionally be further substituted, for example 4-hydroxy-3-methoxy-benzaldehyde, followed by Knoevenagel reaction with a beta-dicarbonyl compound, preferably a beta-diketone, as shown in the following reaction scheme:

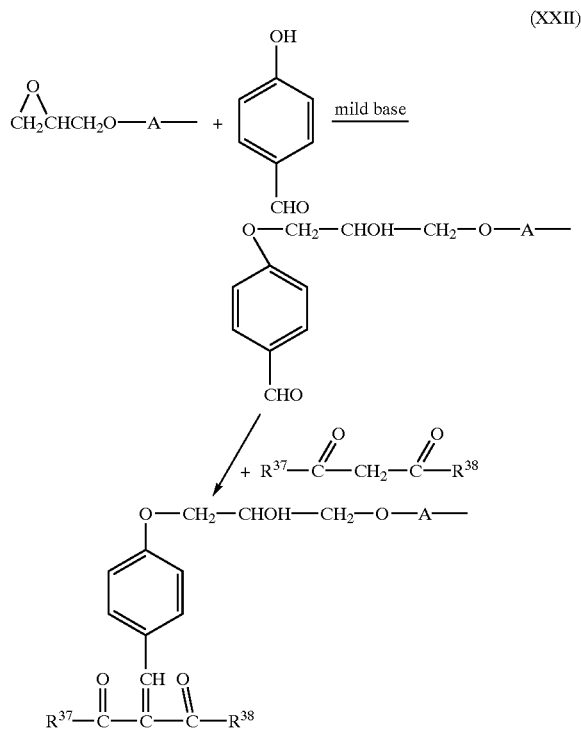
(XXII)

The beta-diketone

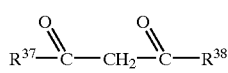

can for example be benzoylacetone, alpha-thenoyltrifluoroacetylmethane, pivaloyl propionylmethane or bis(alpha-furoyl)methane. The resulting compound of formula (XXII) contains no ester linkages and is extremely resistant to hydrolysis.

The Michael acceptor of formula (XLV) containing at least two doubly activated olefinic groups can for example be a phosphonocarboxylate ester containing groups of the formula:

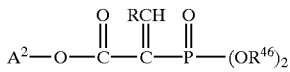
(XLVI)

where $A^2$— is the residue of a polyol $A^2$—$(OH)_n$. Such a Michael acceptor can be prepared by reacting the chloroacetate of a polyol, for example butane-1,4-diol bis(chloroacetate), with trialkyl phosphite to form the phosphonoacetate

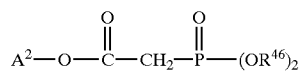

of the polyol, and then carrying out a Knoevenagel reaction with an aldehyde RCHO under the conditions described above. The compound or polymer of formula (XLVI) can alternatively be prepared by a transesterification reaction of a phosphonocarboxylate triester of the formula:

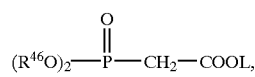

where L is a lower alkyl group, for example a methyl or ethyl group, with a polyol such as 1,6-hexanediol or trimethylolpropane to prepare a polyol ester containing at least two

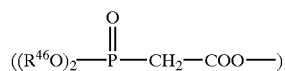

groups, followed by a Knoevenagel reaction. Alternatively the phosphonocarboxylate triester can be reacted first with an aldehyde in a Knoevenagel reaction followed by transesterification with a polyol.

The compound or polymer of formula (XLV) can alternatively contain at least two groups of the formula:

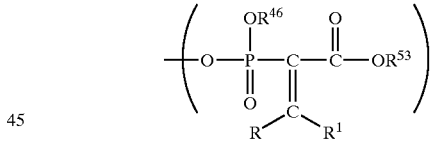
(XLVII)

where $R^{53}$ is an alkyl or aryl group which is optionally substituted. Such a polymer can for example be prepared by reaction of an acidic phosphonocarboxylate diester of the formula:

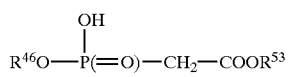

with a compound or polymer containing at least two glycidyl groups, for example the diglycidyl ether of bisphenol A or hydrogenated bisphenol A, to prepare a polyol ester such as

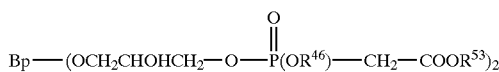

where Bp is a bisphenol A nucleus. This polyol ester can undergo a Knoevenagel reaction with an aldehyde RCHO to form a compound or polymer containing at least two groups (XLVII).

The polymer having repeating units of formula (I) or containing groups of formula (II) can for example be used in a coating, adhesive or sealant composition with a Michael donor in which the nucleophilic groups are thiol groups, for example 1,6-hexanedithiol, bis(2-mercaptoethyl)ether or pentaerythritol tetrakis(beta-mercaptopropionate), primary or secondary amine groups, for example diethylene triamine or an amine-tipped polyether, phosphite ester groups or active hydrogen groups of the formula Y—CH—Y$^1$, where Y and Y$^1$ are each selected from groups of the formula:

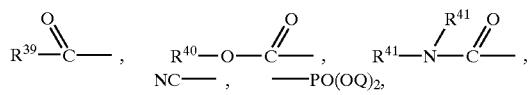

—SO$_2$Q, pyridyl or triazinyl, R$^{39}$, R$^{40}$ and Q each represent an alkyl or aryl group and each group R$^{41}$ represents a hydrogen atom or an alkyl group. The Michael donor can for example be a material containing at least two acetoacetate groups, cyanoacetate groups or beta-diketone groups, for example a polymer of acetoacetoxyethyl methacrylate or trimethylolpropane tris(acetoacetate). The polymer having repeating units of formula (I) can alternatively be used with a Michael donor containing groups having any of the formulae (IV) to (XIX).

The beta-ketoamide groups of formula (IV) can be prepared by the reaction of primary or secondary amine groups with diketene as described in U.S. Pat. No. 4,871,822 or with tetrahydropyrantrione (acetone dicarboxylic anhydride) as described in J. Chem. Soc. C 1971 at p.2721 or by the reaction of amine groups with a cyclic acetone diketene adduct. A polyamine such as diethylene triamine or an amine-tipped polyether can for example be reacted with diketene or tetrahydropyrantrione to prepare a material containing at least two beta-ketoamide groups.

The enamine beta-carboxylate groups of formula (VI) can be formed by the reaction of beta-ketoesters such as acetoacetates with amines or ammonia at ambient or slightly elevated temperatures of up to 100° C., particularly 20–100° C. Higher temperature reaction of beta-ketoesters with amines or ammonia, for example at about 180° C., forms beta-ketoamides. In general, a poly(acetoacetate) can be reacted with ammonia, or a monoamine or a polyamine can be reacted with an alkyl acetoacetate, to produce materials containing two or more enamine beta-carboxylate groups of formula (VI). The enamine beta-carboxylate groups need not be preformed. A compound containing at least two beta-ketoester groups, for example trimethylolpropane tris (acetoacetate), and a substantially non-volatile primary amine having at least 6 carbon atoms can be mixed to form a component of the coating composition. They will react at least partially to form enamine beta-carboxylate groups and will react further as the enamine beta-carboxylate groups are consumed in the Michael curing reaction. The enamine beta-carboxylate groups of formula (VI) can alternatively be formed by the reaction of an amine, for example a polyamine such as a di(primary amine), with an acetylenecarboxylate ester.

The material containing at least two beta-ketoamide groups, or the material containing at least two enamine beta-carboxylate groups, is used in a Michael curing coating, adhesive or sealant composition with a Michael acceptor which is a compound or polymer containing at least two doubly activated olefinic groups. The Michael acceptor can for example be a polymer containing repeating units of formula (I) or a compound or polymer containing at least two groups of formula (II) or (XLV). The electron-withdrawing groups of the Michael acceptor are preferably selected from —CN, acyl groups of the formula

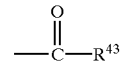

where R$^{43}$ is an optionally substituted alkyl or aryl group, ester groups of the formula:

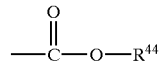

where R$^{44}$ is an optionally substituted alkyl or aryl group, imide groups of the formula —CON(R$^{45}$)$_2$ where each group R$^{45}$, which can be the same or different, is selected from hydrogen and optionally substituted alkyl or aryl, or a triazine group which is optionally substituted, a phosphonate ester group of the formula

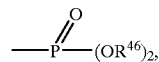

where R$^{46}$ is an optionally substituted alkyl or aryl group, a sulphone group of the formula —SO$_2$R$^{47}$, where R$^{47}$ is optionally substituted alkyl or aryl, or an alpha- or gamma-pyridyl group. The Michael acceptor can for example be prepared from a polyhydroxy compound Z$^6$ —(A$^2$OH)$_n$ where Z$^6$ is a core radical of functionality (n) at least 2 and A$^2$ is an optionally substituted alkylene group, by reaction with either an alkyl malonate diester such as dimethyl malonate to produce the poly(methyl malonate)ester

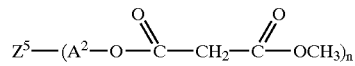

or diketene or a diketene adduct to produce the poly (acetoacetate) ester

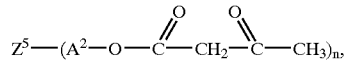

followed in either case by a Knoevenagel reaction with an aldehyde RCHO to convert the active methylene group to a

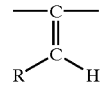

linkage. The polyhydroxyl compound can for example be trimethylolpropane, pentaerythritol or the oligomer octa-caprolactone tetrol sold under the Trade Mark CAPA 316 and having equivalent eight 262 g/mol and Tg −66° C.

A dialkyl malonate such as dimethyl malonate can be reacted with a polyhydroxyl oligomer in a transesterification reaction at about one mole dimethyl malonate per hydroxyl group of the oligomer at temperatures of up to 180° C. with stirring. An organometallic compound such as butyltin chloride dihydroxide is generally used as a catalyst for the reaction. The progress of the reaction can be followed by the amount of methanol co-product evolved.

The acetoacetylation reaction can be carried out using diketene or a cyclic diketene/acetone adduct such as 2,2,6-trimethyl-4H-1,3-dioxin-4-one.

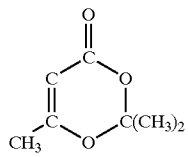

(XXIII)

This compound decomposes when heated above 100° C., for example at 120–180° C., to provide acetylketene and acetone and readily reacts with hydroxyl groups by acetoacetylation.

The subsequent Knoevenagel reaction can be carried out under the conditions and using the aldehydes as described above, most preferably at 0° C. using titanium tetrachloride tetrahydrofuran complex and pyridine as the respective acid and base catalysts.

The Michael acceptor containing at least two doubly activated olefinic groups can alternatively be a triazine compound of the formula:

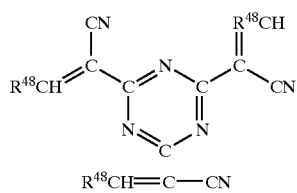

(XXIV)

where $R^{48}$ is hydrogen or an alkyl or aryl group. Such a triazine compound can be prepared from cyanuric chloride by the following reaction scheme:

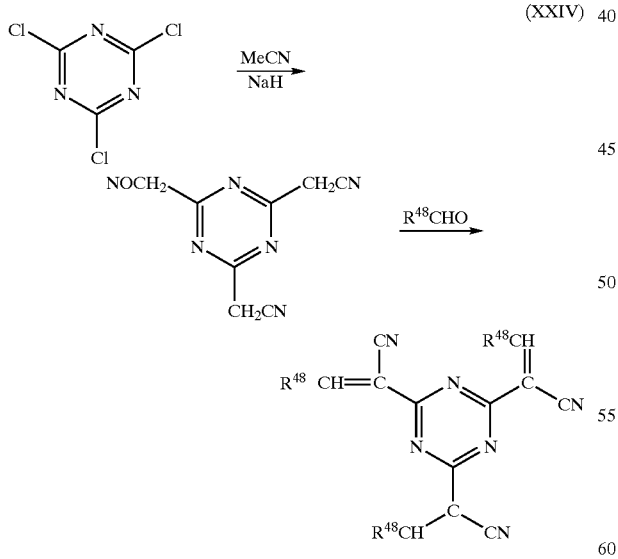

(XXIV)

The enamine amide groups of formula (V) can be formed by the reaction of beta-ketoamide groups with primary amine groups. For example, a polyamine of the formula $Z^7$—$(R^{17}NH_2)_n$, where $Z^7$ is a core radical of valency n, for example a diamine such as hexamethylene diamine, can be reacted with a beta-ketoamide of the formula:

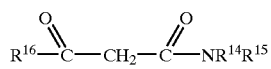

under the conditions described in U.S. Pat. Nos. 4,089,845 and 4,161,580. Alternatively, a compound or polymer containing beta-ketoamide groups, prepared as described above, can be reacted with an amine of the formula $R^{17}NH_2$.

The heterocyclic groups of formula (VII) can for example be cyclic beta-ketocarboxylic amide groups such as pyrrolidindione groups of the formula:

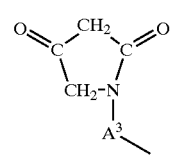

(XXV)

These can be formed by the reaction of an amine, for example a polyamine of the formula $A^3(NH_2)_n$ such as hexamethylene diamine, with 2,2-dimethyl-6-bromomethyl-1,3-dioxen-4-one (the bromination product of (XXIII)) with elimination of acetone.

The heterocyclic groups of formula (VIII) can for example be amino-substituted pyrrolinone groups of the formula:

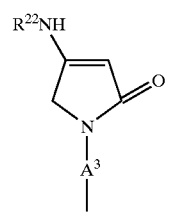

(XXVI)

which can be formed from pyrrolidindione groups of formula (XXV) by reaction with an amine $R^{22}NH_2$.

The heterocyclic groups of formula (IX) can for example be cyclic enamine beta-carboxylate ester groups such as 4-aminofuranone groups of the formula:

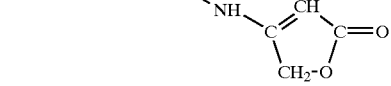

(XXVII)

or cyclic enamine beta-carboxylic amide groups such as 4-aminopyrrolinone groups of the formula:

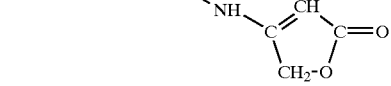

(XXVIII)

where $R^{49}$ is hydrogen or an alkyl or aryl group. The 4-aminofuranone groups of formula (XXVII) can for example be prepared by reaction of a polyamine $A^4(NH_2)_n$ with furan-2,4-dione or a gamma-chloroacetoacetate ester.

The 4-amino-pyrrolinone groups of formula (XXVIII) can be prepared by reacting a polyamine $A^4(NH_2)_n$ with a pyrrolidindione.

The heterocyclic groups of formula (X) or (XI) can for example be pyrazolone groups of the formula:

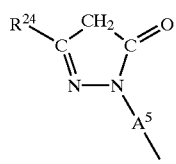

or

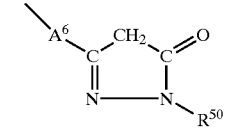

where $R^{50}$ is a hydrogen atom or an alkyl or aryl group, or tetrahydro-1,4-diazepin-5-ones of the formula (XXXI) or isoxazolones of the formula (XXXII)

(XXXI)

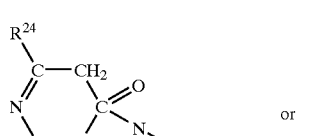

or (XXXII)

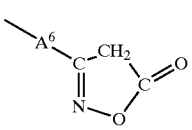

The pyrazolone groups can readily be synthesised by reaction of hydrazines with beta-ketoester groups. Pyrazolones of formula (XXIX) can be formed from poly(hydrazines), particularly bishydrazines of the formula $A^5(NHNH_2)_2$, by reaction with a beta-ketoester such as methyl or ethyl acetoacetate. Pyrazolones of formula (XXX) can be formed by reaction of a bis(4-thioacetoacetate), formed from a dathiol and a gamma-chloroacetoacetate, with hydrazine or an alkylhydrazine or arylhydrazine.

(XXXIII)

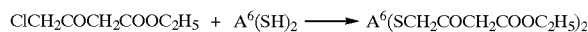

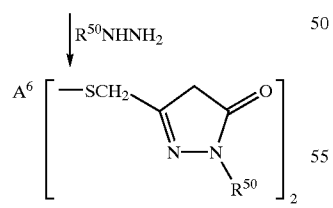

The tetrahydro-1,4-diazepin-5-ones can likewise be synthesised from 1,2-diamines by reaction with a beta-ketoester as described for example in U.S. Pat. No. 4,315,860. In particular, tetrahydrodiazepinones of formula (XXXI) can be synthesised by reaction of bis(beta-aminoamines) of the formula $A^5(NHCH_2CH_2NH_2)_2$ with methyl or ethyl acetoacetate or benzoylacetate. Isoxazolone groups can be formed from beta-ketoester groups by reaction with hydroxylamine.

The heterocyclic groups of formula (XII) or (XIII) can for example be hydantoins where $X^3$ or $X^5$ is O, and $Z^5$ is

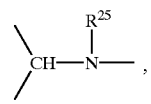

for example compounds having groups of formula (XII) can be bis(hydantoins) of the formula:

(XXXIV)

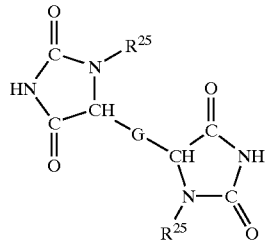

or compounds having groups of formula (XIII) can be bis(hydantoins) of the formula:

(XXXV)

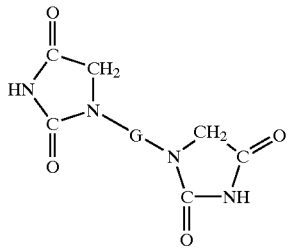

where G is a hydrocarbon or polyether chain. Compounds of formula (XXXIV) can be prepared from a hydrocarbon or polyether chain tipped with aldehyde groups, and compounds of formula (XXXV) can be prepared from a hydrocarbon or polyether chain tipped with primary amine groups, as shown by the following reaction schemes:

(XXXVI)

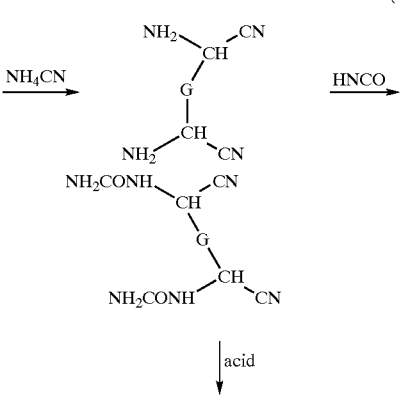

-continued

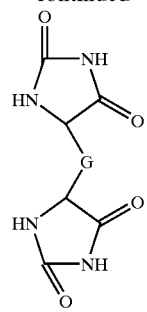

(XXXVII)

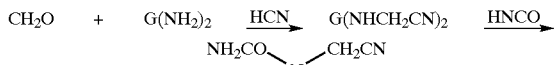
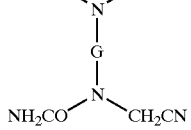

↓ acid

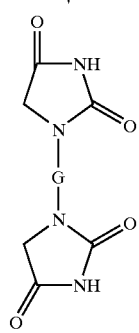

Alternatively, the heterocyclic groups of formula (XII) or (XIII) can be analagous 2-thiohydantoin groups in which $X^3$ or $X^5$ is a sulphur atom; these can be prepared by reactions similar to the above using HSCN in place of HNCO. As a further alternative, the heterocyclic groups of formula (XII) can be rhodanine groups of the formula:

(XXXVIII)

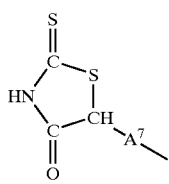

Compounds containing rhodanine groups of formula (XXXVIII) can be prepared from a hydrocarbon or polyether chain tipped with alpha-halo (chloro or bromo)-carboxylic acid groups by reaction with ammonium dithiocarbamate.

Thio-containing unsaturated ester groups of formula (XV) can be formed from a mercaptan and the diester of a diol and an alkynylcarboxylic acid $$(HC\equiv CCO)_2A^{10} + R^{29}SH \rightarrow (R^{29}SCH=CHCOO)_2A^{10}.$$

Thio-containing lactone groups of formula (XIV) can be formed by Michael addition of a bis-mercaptan and a butenolide, followed by oxidation to regenerate the butenolide ring (XXXIX)

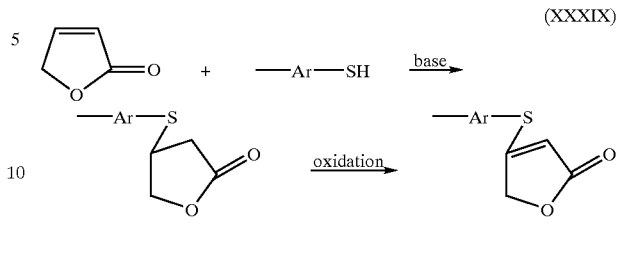

where Ar is an arylene group.

The phosphonite ester groups (XVI) or (XVII) or phosphinite ester groups (XVIII) or (XIX) can for example be formed by reaction of a compound or polymer containing free hydroxyl groups with the appropriate organophosphorus chloride. If a cyclic phosphonite ester or phosphinite ester is used, the compound or polymer (B) need only contain one such cyclic phosphonite or phosphinite ester group, since this will react both by Michael-type addition and by ring-opening polymerisation of the Michael adduct to form a crosslinked network. For example, a cyclic phosphonite ester will react with an acrylate-functional polymer containing acrylate groups derived from the reaction of glycidyl groups with acrylic acid as shown below

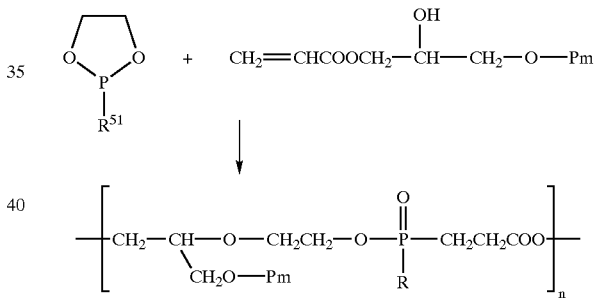

where Pm is a polymer residue. Other compounds or polymers containing at least two activated olefinic double bonds such as acrylate groups can be used. The invention therefore includes a coating, adhesive or sealant composition curable by Michael reaction comprising (A) a Michael acceptor which is a compound or polymer containing at least two activated olefinic double bonds and (B) a Michael donor which is a compound containing a nucleophilic group, characterised in that the nucleophilic group of the Michael donor (B) is selected from cyclic phosphonite esters of the formula:

(XLI)

and cyclic phosphinite esters of the formula:

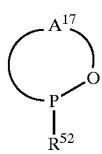
(XLII)

where $R^{51}$ and $R^{52}$ each represent an optionally substituted alkyl or aryl group and $A^{16}$ and $A^{17}$ each represent an optionally substituted alkylene group. The alkylene group $A^{16}$ preferably contains 2 to 4 carbon atoms, for example the cyclic phosphonite ester can be ethylene phenylphosphonite, which is readily prepared from $C_5H_5PCl_2$ and ethylene glycol. Cyclic phosphonite ester groups can in general be readily prepared by hydrolysis of epoxide groups. Particularly preferred Michael donors are those containing two or more cyclic phosphonite ester groups (compounds of formula (XVI) in which $R^{31}$ and $A^{11}$ are joined) derived from polyepoxides such as the diglycidyl ether of bisphenol A, a glycidyl acrylate polymer or the diepoxide of 1,7-octadiene. The alkylene group $A^{17}$ preferably contains 3 to 5 carbon atoms.

The Michael donor compounds containing nucleophilic groups of any of the formulae (V) to (XIX) can in general be used in coating, adhesive or sealant compositions with any Michael acceptor containing at least two activated olefinic double bonds. The Michael acceptor preferably contains doubly activated olefinic double bonds, for example a polymer containing repeating units of formula (I) or a polymer or compound containing groups of formula (II), (III) or (XLV), for most rapid curing. The Michael donor compounds can alternatively be used with known Michael acceptors such as acrylates, for example trimethylolpropane triacrylate, pentaerythritol tri- or tetra-acrylate, the tetra-acrylate of "CAPA 316" described above, or an acrylate-tipped oligomer such as a urethane acrylate, melamine acrylate, polyester acrylate or silicone acrylate, to form coating, adhesive or sealant compositions which cure more rapidly, for example 5 or 10 times faster, than known compositions based on Michael donor compounds containing acetoacetate groups. The Michael donor compounds of the present invention can if desired be used in conjunction with known Michael donors such as an acetoacetate, for example an acetoacetate of a polyol or a polymer of acetoacetoxyethyl methacrylate, to give coating, adhesive or sealant compositions which cure faster at ambient temperature than similar compositions based on acetoacetate alone.

Many of the coating, adhesive or sealant compositions of the invention preferably contain a basic catalyst, although Michael donors of formulae (XIV) to (XIX) cure readily without the use of basic catalysts. Tertiary amine catalysts are usually preferred as basic catalysts. These may be strongly basic amines such as diazabicycloundecene or diazabicyclononene or a substituted guanidine for most rapid curing or less basic tertiary amines such as triethylamine. U.S. Pat. No. 4,408,018 teaches that tertiary amines such as triethylamine are not sufficiently alkaline to act as catalysts for Michael curing coating compositions, but we have found that compositions containing a Michael donor having nucleophilic groups of formula (IV) or any of formulae (VII) to (XIII) can cure in less than an hour at ambient temperature when catalysed by triethylamine, particularly if the Michael acceptor contains doubly activated olefinic double bonds. In one preferred embodiment of the invention, a tertiary amine capable of imparting stability against degradation by light, particularly UV light and sunlight, is used as catalyst, preferably as the only basic catalyst. Such an amine is generally a sterically hindered amine such as pentamethylpiperidine or a derivative thereof, particualarly bis(1,2,2,6,6-pentamethyl-4-piperidyl) sebacate sold commercially under the Trade Mark Tinuvin 292.

An alternative form of preferred catalyst is an alkali metal salt of an activated methylene compound in which the methylene is activated by two adjacent electron-withdrawing groups, for example the sodium or potassium salt of an acetoacetic ester such as ethyl acetoacetate or a malonate diester such as diethyl malonate.

Michael donor compounds containing enamine amide groups of formula (V), enamine beta-carboxylate groups of formula (VI), cyclic enamine amides or beta-carboxylates of formula (VIII) or (IX) or thio-containing ester or lactone groups of formula (XIV) or (XV) have the advantage that they can form coating compositions with Michael acceptors which will cure at ambient temperature without the need for any catalysts, for example in a time of 2 to 3 hours when a Michael acceptor containing doubly activated olefinic double bonds is used. The point of nucleophilic reaction, in contradistinction to other amines which take part in a Michael-type reaction, is not through the N atom. For example, a group of formula (V) reacts with an activated double bond as follows:

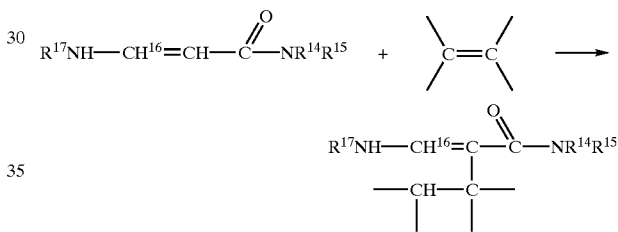
(XLIII)

and a group of formula (VI) reacts as follows:

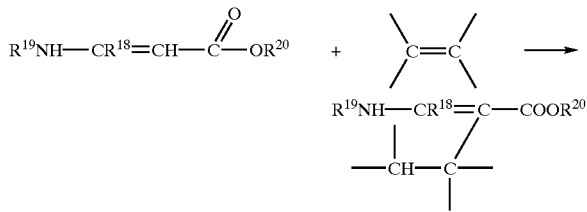
(XLIV)

In general, the nucleophilic groups (IV) to (XIII) take part in the Michael reaction through an activated methylene group, for example in a linkage

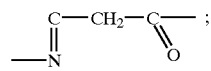 ;

this linkage alternatively may be represented

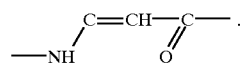 .

The groups of formulae (XIV) and (XV) react with an activated double bond as follows:

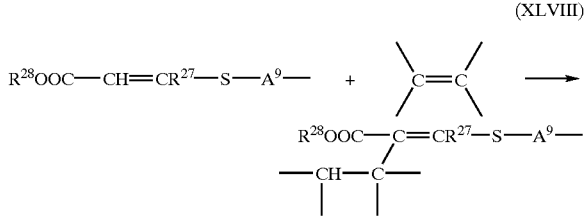

(XLVIII)

A Michael donor containing phosphonite or phosphinite ester groups, for example those of formulae (XVI) to (XIX), can be used with the same Michael acceptors described above, but the composition is preferably catalysed by a quaternary ammonium halide such as tetrabutylammonium iodide.

The compositions of the invention may contain an organic solvent, for example an aromatic hydrocarbon such as xylene, a ketone such as methyl isobutyl ketone or an ester or etherester such as butyl acetate or methoxypropyl acetate, or they may be solventless. Many of the Michael donors of formulae (IV) to (XIX) are liquids suitable for inclusion in solventless compositions or can be used with liquid Michael acceptors. Similarly, many of the Michael acceptors of formulae (I) to (III) or (XLV) are liquids or can be used with liquid Michael donors. Michael donors of asymmetric molecular structure may be preferred since they are more likely to be liquid or of low Tg and may give rise to tougher cured films.

The compositions of the invention are generally packaged as 2-pack compositions in which the Michael acceptor and the Michael donor are packaged separately and mixed up to 8 hours, preferably up to 2 hours, before use or at the time of application as in the case of coatings applied by twin-feed spray or sealants or adhesives applied from a twin-barrel applicator.

The coating, sealant or adhesive composition may contain additional ingredients. For example, coating compositions will generally contain pigments, for example anticorrosive pigments such as zinc phosphate or sodium zinc molybdate, or colouring and opacifying pigments such as titania, iron oxide or phthalocyanine pigments. Sealant compositions will also generally contain pigments and/or fillers such as calcium carbonate or talc and all types of composition may contain additives such as plasticisers, thixotropes such as silica gel or bentonite clay, or stabilising agents.

The invention is illustrated by the following Examples:

EXAMPLE 1

Poly-(1,6-hexanediol 1,1-propylenedicarboxylate)

A stirred mixture of dimethyl 1,1-propylenedicarboxylate (16.28 g, 0.103 mol), 1,6-hexanediol (10.96 g, 0.093 mol), n-butyltin chloride dihydroxide (0.53 g) and p-quinol (1.74 g) was heated under nitrogen to 130° C. over 80 min and then to a maximum of 190° C. over a further 100 min, with collection of methanol (7 ml, 93%) in a Dean and Stark apparatus by distillation from the reaction mixture.

The cooled product (23.15 g) was dissolved in dichloromethane, and the solution was washed with aqueous potassium sodium tartrate solution and dried (MgSO$_4$). Removal of solvent and drying (85° C./100 Pa/1 hr) gave poly-(1,6-hexanediol 1,1-propylenedicarboxylate) as a viscous liquid (20.21 g, yield 94%), identified by NMR. The polymer had olefinic functionality 7.9 and equivalent weight 253.

1.51 g polymer was mixed with 0.74 g pentaerythritol tetrakis(β-mercaptopropionate), cast as a film and cured at 95° C. for 3 hours.

The crosslinked polymer film had: Tg −11° C. by DSC, Tg −7° C. by DMA, sol content 2%, linear swell (ethyl acetate) 19%, hydrolytic weight loss (1M NaOH, 1 week) 3%, initial 20° gloss 70, gloss retention 70% after 300 MJm$^{-2}$ solar UV exposure.

EXAMPLES 2 and 3

Following the procedure of Example 1, coating films were prepared from the polymer of Example 1 with bis(β-mercaptoethyl) ether (Example 2) or 1,6-hexanedithiol (Example 3). The results are shown in Table 1 below.

TABLE 1

|  | Example 2 | Example 3 |
|---|---|---|
| Weight of polymer of Example 1 | 1.56 g | 1.54 g |
| Weight of bis (β-mercaptoethyl ether) | 0.44 g | — |
| Weight of 1,6-hexanedithiol | — | 0.46 g |
| Tg of cured film by DSC | −36° C. | −36° C. |
| Tg of cured film by DMA | −23° C. | −21° C. |
| Gloss retention after 300 MJm$^{-2}$ UV | 60% | 75% |

EXAMPLE 4

Poly-(1,3-propanediol malonate)

A stirred mixture of dimethyl malonate (27.18 g, 0.206 mol), 1,3-propanediol (14.05 g, 0.185 mol) and titanium tetraisopropoxide (0.35 g) was heated to 120° C. over 30 min and then to a maximum of 170° C. over a further 2.5 h, with collection of methanol (14 ml, 94%) in a Dean and Stark apparatus by distillation from the reaction mixture.

The cooled product (28.34 g, 97%) was dissolved in dichloromethane, and the solution was washed with aqueous disodium hydrogen phosphate solution and dried (MgSO$_4$). Removal of solvent and drying (85° C./200 Pa/2 h) gave poly-(1,3-propanediol malonate) as a viscous liquid (26.30 g, yield 90), identified by NMR. Degree of polymerisation 6.3; Molecular weight (Mn) 1040; Malonate equivalent weight 142.

Poly-(1,3-propanediol β,β-styrenedicarboxylate)

A solution of titanium tetrachloride in dichloromethane (1.0 M, 100 ml, 0.10 mol) was added slowly to tetrahydrofuran (200 ml) at 0–10° C., with stirring under nitrogen, to give a yellow precipitate of the TiCl$_4$/THF complex. To the stirred suspension of TiCl$_4$/THF (0.10 mol) in tetrahydrofuran/dichloromethane at 0–10° C. was slowly added dropwise a solution of poly-(1,3-propanediol malonate) (7.55 g, 0.0530 g eq wt) and benzaldehyde (6.41 g, 0.0604 mol) in THF (30 ml). After 1.5 hours at 0° C., pyridine (15.65 g, 0.20 mol) in THF (20 ml) was added dropwise at 0–10° C. over 40 min, with separation of a brown gum. Stirring was continued for 20 hours at 0° C., during which the gum redissolved. Water and diethyl ether were then added to the light tan reaction mixture, the aqueous layer was washed with diethyl ether, and the combined organic phases were dried (MgSO$_4$). Removal of solvent and drying (100° C./100 Pa) gave poly-(1,3-propanediol β,β-styrenedicarboxylate) as a viscous liquid which on cooling became a gum (11.16 g, yield 96%), identified by NMR. Degree of polymerisation 6.2; functionalisation of reactive sites 93%; Olefinic functionality 6.4, Molecular weight (Mn) 1550; Olefin equivalent weight 249.

1.81 g polymer ($7.30 \times 10^{-3}$ equivalents) was mixed with 0.91 g ($1.86 \times 10^{-3}$ mol) pentaerythritol tetrakis (β-mercaptopropionate) (PETMP), 9.7 mg tri-n-butylamine and 0.14 g toluene and allowed to cure at ambient temperature. Gelation occurred after 30 minutes. The crosslinked polymer film had: Tg 42° C. ($Tg^\infty$ 48° C.) by DSC, initial 20° gloss 70, gloss retention 70% after 300 $MJm^{-2}$ solar UV exposure.

The curing reaction was repeated using 1.62 g polymer, 0.70 g PETMP, 9.6 mg tri-n-butylamine and 0.55 g di-n-butyl phthalate plasticiser. The cured film had Tg −2° C. by DSC (+29° C. by DMA), linear swell (ethyl acetate) 100%, and anhydrolytic weight loss (1M NaOH, 1 week) 2%.

EXAMPLES 5 and 6

Following the procedure of Example 4 coating films were prepared from the polymer of Example 4 and bis(β-mercaptoethyl) ether (Example 5) or 1,6-hexanedithiol (Example 6). The results are shown in Table 2 below.

TABLE 2

|  | Example 5 | Example 6 |
|---|---|---|
| Weight of polymer of Example 4 | 2.06 g | 2.06 g |
| Weight of bis (β-mercaptoethyl)ether | 0.48 g | — |
| Weight of 1,6-hexanedithiol | — | 0.51 g |
| Weight of tri-n-butylamine catalyst | 14.1 mg | 26.6 mg |
| Weight of di-n-butyl phthalate plasticiser | 0.28 g | 0.28 g |
| Tg of cured film by DSC | 6° C. | 2° C. |
| Tg of cured film by DMA | 25° C. | 19° C. |
| Linear swell (ethyl acetate) | 17% | 19% |
| Hydrolytic weight loss (1M NaOH, 1 week) | 1% | 0% |
| Initial 20° gloss | 75 | 55 |

EXAMPLES 7 and 8

Poly(1,6-hexanediol β,β-styrenedicarboxylate) (Example 7) and poly(1,10-decanediol β,β-styrenedicarboxylate) (Example 8) were prepared by the process described in Example 4 but using equimolar amounts of 1,6-hexanediol (Example 7) or 1,10-decanediol (Example 8). Unplasticised coating films were prepared by the process of Example 4 using an equivalent amount of the polymer and the same amounts of PETMP and tributylamine and toluene as in Example 4. The properties of the films are shown in Table 3 below.

TABLE 3

|  | Example 7 | Example 8 |
|---|---|---|
| Tg of cured film by DSC | 25° C. | 14° C. |
| Tg of cured film by DMA | 48° C. | 27° C. |
| 25near swell (ethyl acetate) | 10% | 16% |
| Hydrolytic weight loss (1M NaOH, 1 week) | 0 | 0 |
| Initial 20° gloss | 80 | 90 |

EXAMPLE 9

Poly-(1,3-propanediol β,β-styrenedicarboxylate) was prepared by a modification of the procedure in "Organic Syntheses" (C F H Allen and F W Spangler Organic Synthesis, 1955, Coll. Vol. 3, 377–379), from poly-(1,3-propanediol malonate) and benzaldehyde, in the presence of benzoic acid (4 mol %) and piperidine (6 mol %), using toluene as solvent instead of benzene. Solvent was removed under reduced pressure (90° C./400 Pa), the product was dissolved in dichloromethane, and the solution was washed with water and aqueous sodium carbonate solution and dried ($MgSO_4$). Removal of solvent gave poly-(1,3 -propanediol β,β-styrenedicarboxylate) as a clear gum (yield 92%), identified by NMR. Degree of polymerisation 4.6; molecular weight (Mn) 1140; olefin equivalent weight 252.

Curing of Poly-(1,3-propanediol β,β-styrenedicarboxylate) (PPDSDC) with Neopentylene Glycol Bis(acetoacetate) [NPGBAA]

PPDSDC (0.504 g) was mixed with NPGBAA (0.271 g) and then with 1,8-diazabicyclo[5.4.0] undec-7-ene (DBU) (0.0185 g) in the presence of ethyl acetate (0.126 g) and 1-methoxy-2-propanol (0.074 g). The polymer mixture (non-volatile content 80% w/w) was cast as a film and cured at ambient temperature (tack-free time 150 minutes). Crosslinked polymer properties are given in Table 4 [System PPDSDC/NPGBAA (DBU)].

By comparison, when trimethylolpropane triacrylate and a copolymer of β-methacryloxyethyl acetoacetate and butyl acrylate were cured using DBU under similar conditions. The tack-free time at ambient temperature was about 3 days.

EXAMPLE 10

Poly-(1,3-propanediol 1-isopentene-1,1-dicarboxylate)

Poly-(1,3-propanediol 1-isopentene-1,1-dicarboxylate) was prepared by a modification of the procedure of Ravve et al. (J Polym Sci Polym Chem Ed, 1973, 11, 1733–1752), from poly-(1,3-propanediol malonate) and isobutyraldehyde, in the presence of isobutyric and benzoic acids (total acid 4 mole %) and piperidine (6 mole %), using 2.0 equivalents of aldehyde instead of 1.5 equivalents. Solvent (toluene) was removed under reduced pressure (50° C./2000 Pa), the product was dissolved in dichloromethane, and the solution was washed with aqueous sodium carbonate solution and water and dried ($MgSO_4$). Removal of solvent gave poly-(1,3-propanediol 1-isopentene-1,1-dicarboxylate) as a viscous liquid (yield 98%), identified by NMR. Degree of polymerisation 6.9; functionalisation of reactive sites 99%; olefinic functionality 7.6; molecular weight (Mn) 1520; olefin equivalent weight 203.

Curing of Poly-(1,3-propanediol 1-isonentene-1,1-dicarboxylate (PPDIDC) with Neopentylene Glycol Bis(acetoacetate)[NPGBAA]

PPDIDC was cured with NPGBAA in the presence of DBU and 1-methoxy-2-propanol using the procedure of Example 9. Cure behaviour was similar (tack-free time 150 minutes at ambient temperature) and the cured film had similar properties.

EXAMPLE 11

Curing of Poly-(1,3-propanediol 1-isopentene-1,1-dicarboxylate) with Pentaerythritol Tetrakis-(β-mercaptopropionate) Using Hindered Amine Light Stabiliser as Base Catalyst Poly-(1,3-propanediol 1-isopentene-1,1-dicarboxylate) of Example 10 (2.00 g) was mixed with pentaerythritol tetrakis-(β-mercaptopropionate) (1.20 g, 2.46 mmol) and bis-(1,2,2,6,6-pentamethyl-4-piperidyl)sebacate (Tinuvin 292 light stabiliser) (56 mg, 0.11 mmol) as amine catalyst, cast as a film and allowed to cure at ambient temperature. Gelation occurred after 20 minutes. The crosslinked polymer film had: Tg 43° C. by DSC; sol content 2%; linear swell (ethyl acetate) 9%; hydrolytic weight loss (1M NaOH, 1 week) 1%; initial 60° gloss 98; gloss retention 95% after 1268 hours and 88% after 2034 hours UV exposure in a QUT test apparatus.

EXAMPLE 12

Following the procedure of Example 10, poly-(1,6-hexanediol 1-isopentene-1,1-dicarboxylate) was prepared from poly-(1,6-hexanediol malonate) and isobutyraldehyde and was recovered as a viscous liquid (yield 94%), identified by NMR. Degree of polymerisation 5.9%; functionalisation of reactive sites 96%; olefinic functionality 6.1; molecular weight (Mn) 1510; olefin equivalent weight 247.

The polymer of Example 12 was cured with pentaerythritol tetrakis($\beta$-mercaptopropionate) following the procedure and proportions of reagents and catalyst used in Example 11. It cured slightly more slowly than the polymer of Example 11 but had gelled within 30 minutes. The properties of the crosslinked polymer film were similar to those of the film of Example 11.

EXAMPLE 13

Poly-(1,10-decanediol malonate) was prepared from dimethyl malonate (274.04 g, 2.08 mol), 1,10-decanediol (323.64 g, 1.86 mol) and titanium tetraisopropoxide (4.80 g, 0.0169 mol) using the procedure of Example 4 and was recovered as a waxy solid (402.11 g, yield 87%), identified by NMR. Degree of polymerisation 4.4; molecular weight (Mn) 1130; malonate equivalent weight 238.

Following the procedure of Example 9, poly-(1,10-decanediol $\beta,\beta$-styrenedicarboxylate) was prepared from poly-(1,10-decanediol malonate) and benzaldehyde and recovered as a viscous liquid (yield 95%), identified by NMR. Degree of polymerisation 4.3; functionalisation of reactive sites 94%; olefinic functionality 4.4; molecular weight (Mn) 1500; olefin equivalent weight 347.

Curing of Poly-(1,10-decanediol $\beta,\beta$-styrenedicarboxylate) with 1,1,1-Trimethylolpropane Tris(acetoacetate)

Poly-(1,10-decanediol $\beta,\beta$-styrenedicarboxylate) (Eq Wt 347; 2.450 g, 7.21×10$^{-3}$ gram-equivalents) was mixed with 1,1,1-trimethylolpropane tris(acetoacetate) (0.807 g, 2.09 mmol) and ethyl $\alpha$-sodio acetoacetate (0.035 g, 3.02 mole). The polymer mixture was cast as a film and allowed to cure at ambient temperature. Gelation occurred 40 minutes after mixing, and the film was tack-free overnight. The crosslinked polymer film had: Tg 16° C. by DSC, Tg 26° C. by DMA, 60° gloss 96 units.

EXAMPLE 14

Following the procedure of Example 10, poly-(1,10-decanediol 1-isopentene-1,1-dicarboxylate) was prepared from poly-(1,10-decanediol malonate) and isobutyraldehyde and recovered as a viscous liquid (yield 88%), identified by NMR. Degree of polymerisation 4.6; functionalisation of reactive sites 95%; olefinic functionality 4.8; molecular weight (Mn) 1450; olefin equivalent weight 303.

Curing of Poly-(1,10-decanediol 1-isopentene-1,1-dicarboxylate) with 1,1,1-Trimethylolpronane Tris (acetoacetate)

Poly-(1,10-decanediol 1-isopentene-1,1-dicarboxylate (Eq Wt 303; 2.502 g, 8.25×10$^{-3}$ gram-equivalents) was mixed with 1,1,1-trimethylolpropane tris(acetoacetate) (1.023 g, 2.65 mmol, 7.95×10$^{-3}$ g-eq) and ethyl $\alpha$-sodio acetoacetate (0.010 g, 0.07 mmol, 0.84 mol %). The polymer mixture was cast as a film and allowed to cure at ambient temperature. Gelation occurred 15 minutes after mixing, and the film was tack-free overnight. The crosslinked polymer film had: Tg 14° C. by DSC, Tg 31° C. by DMA.

EXAMPLE 15

Ethylene Bis[(diethyl phosphono) acetate]

Ethylene bis[(diethyl phosphono)acetate] was prepared by a modification of the procedure described in U.S. Pat. No. 3,943,200 employing a shorter reaction time and lower final temperature. To ethylene bis(chloroacetate) (107.5 g, 0.5 mol) under nitrogen at 150° C. triethyl phosphite (166.0 g, 1.0 mol) was slowly added over 60 minutes with stirring, and the reaction mixture was maintained at 150° C. for a further 3 hours. Continuous evolution of ethyl chloride occurred throughout the reaction. Removal of volatiles under vacuum gave ethylene bis [(diethyl phosphono) acetates as a straw-coloured liquid (197.5 g, 95%), identified by NMR.

Ethylene Bis[(diethyl $\alpha$-phosphono)cinnamate]

A stirred solution of ethylene bis[(diethyl phosphono) acetate] (10.0 g, 23.9 mmol), benzaldehyde (7.6 g, 71.7 mmol) and piperidine (0.41 g, 4.8 mmol) in toluene (100 ml) was refluxed under nitrogen for 1 hour until no more water was collected in a Dean and Stark trap. The cooled reaction mixture was filtered through a silica gel plug, and removal of volatiles gave ethylene bis[(diethyl $\alpha$-phosphono) cinnamate]as a yellow viscous oil (13.6 g, 96%), identified by NMR.

Curing of Poly-[(n-butyl acrylate)-co-($\beta$-methacryloyloxyethyl acetoacetate)] with ethylene bis[(diethyl $\alpha$-phosphono)cinnamate]

A copolymer of n-butyl acrylate and $\beta$-acetoacetate in molar ratio 7:3 (2.00 g, 3.7×10$^{-3}$ gram-equivalents) was mixed with ethylene bis[(diethyl $\alpha$-phosphono)cinnamate] (1.10 g, 3.7×10$^{-3}$ gram equivalents) and 1,8-diazabicyclo-(5.4.0] undec-7-ene (23 mg, 0.151 mmol) and allowed to cure at ambient temperature. Gelation occurred after 30 minutes. The crosslinked polymer film had 60° gloss 62 units, Tg 0° C. by DSC, Tg 24° C. by DMA.

EXAMPLE 16

Curing of Poly-[(3-mercapto-1-propyl) methylsiloxane] with Ethylene bis[(diethyl $\alpha$-phosphono)cinnamate]

Poly-[(3-mercapto-1-propyl)methylsiloxane] (2.00 g, 14.9×10$^{-3}$ gram-equivalents) was mixed with ethylene bis [(diethyl $\alpha$-phosphono)-cinnamate] (4.40 g, 14.9×10$^{-3}$ gram-equivalents) and bis-(1,2,2,6,6-pentamethyl-4-piperidyl)sebacate (60 mg, 0.236×10$^{-3}$ gram-equivalents) and allowed to cure at ambient temperature. Gelation occurred after 3 minutes. The crosslinked polymer film had Tg −4° C. by DSC.

EXAMPLE 17

Curing of Poly-(1,3-propanediol 1-isopentene-1,1-dicarboxylate) and Ethylene Bis[(diethyl $\alpha$-phosphono)cinnamate] with Pentaerythritol Tetrakis-($\beta$-mercaptopropionate Poly-(1,3-propanediol 1-isopentene-1,1-dicarboxylate) (1.80 g, 8.82×10$^{-3}$ gram-equivalents) was mixed with ethylene bis[(diethyl α-phosphono)cinnamate] (0.29 g, 0.98× $10^{-3}$ gram-equivalents), pentaerythritol tetrakis-(β-mercaptopropionate) (1.20 g, 9.80×$1^{-3}$ gram equivalents) and bis-(1,2,2,6,6-pentamethyl-4-piperidyl)sebacate (56 mg, 0.22×$10^{-3}$ gram equivalents) and allowed to cure at ambient temperature. Gelation occurred after 10 minutes. The crosslinked polymer film had 60° gloss 77 units, Tg 3° C. by DSC, Tg 12° C. by DMA.

EXAMPLE 18

Ethylene bis[(diethyl 2-phosphono)-2-isohexenoate)

A stirred solution of ethylene bis[(diethyl phosphono) acetate] (10.0 g, 23.9 mmol), isobutyraldehyde (10.0 g, 138.7 mmol) and piperidine (0.50 g, 5.87 mmol) in toluene (100 ml) was refluxed under nitrogen for 1 hour, after which further isobutyraldehyde (10.0 g, 138.7 mmol) and piperidine (0.50 g, 5.87 mmol) were added, and the reaction mixture was refluxed for another 2 hours, until no more water was collected in a Dean and Stark trap. The cooled reaction mixture was filtered through a silica gel plug, and removal of volatiles gave ethylene bis[(diethyl 2-phosphono)-2-isohexeneoate] as a pale yellow viscous oil (12.3 g, 98%), identified by NMR.

Curing of Poly-(1,3-propanediol 1-isopentene-1,1-dicarboxylate) and Ethylene Bis[(diethyl 2-phosphono)-2-isohexenoate] with Pentaerythritol Tetrakis-(β-mercaptopropionate)

Poly-(1,3-propanediol 1-isopentene-1,1-dicarboxylate) (1.80 g, 3.82×$10^{-3}$ gram-equivalents) was mixed with ethylene bis[(diethyl 2-phosphono)-2-isohexenoate] (0.26 g, 0.98×$10^{-3}$ gram-equivalents), pentaerythritol tetrakis-(β-mercaptopropionate) (1.20 g, 9.80×$10^{-3}$ gram-equivalents) and bis-(1,2,2,6,6-pentamethyl-4-piperidyl)sebacate (56 mg, 0.22×$10^{-3}$ gram-equivalents) and allowed to cure at ambient temperature. Gelation occurred after 20 minutes. The crosslinked polymer film had 60° gloss 82 units, Tg 21° C. by DSC.

EXAMPLE 19

To 5-amino-2,2,4-trimethylcyclopentylmethylamine (127.72 g, 0.819 mol) in xylene (525 ml) at 122° C. was added with stirring 2,2,6-trimethyl-1,3-dioxen-4-one (232.51 g, 1.637 mol) in xylene (525 mol) over 10 minutes, during which the temperature decreased to 104° C. After heating to 113° C. over 5 minutes, vigorous effervescence and distillation of acetone (through a Vigreux column) commenced. Pot temperature was increased to 127° C. over 5 minutes and to 140° C. over a further 30 minutes, with collection of acetone distillate. After cooling to 39° C., dichloromethane was added, and removal of solvent and drying (93° C./100 Pa) gave 1-acetoacetamido-2-acetoacetamidomethyl-3,3,5-trimethylcyclopentane (237.03 g, 89%), (AAMTCP), which was crushed to a light yellow powder, mp 94–114° C. (mixture of stereoisomers), and identified by $^1$H-NMR, $^{13}$C-NMR, FT-IR and Raman spectra.

Poly-(1,3-propanediol β,β-styrenedicarboxylate) (PPDSDC) (0.756 g) was mixed with AAMTCP (0.4855 g) and then with 1,8-diazabicyclo[5.4.0] undec-7-ene (DBU) (0.027 g) in the presence of 1-methoxy-2-propanol (0.402 g). The polymer mixture (non-volatile content 76% w/w) was cast as a film and allowed to cure at ambient temperature. Gelation occurred 4 minutes after complete mixing, and the film was tack-free after 120 minutes. Crosslinked polymer film properties are given in Table 4 [System PPDSDC/AAMTCP (DBU)].

EXAMPLE 20

Poly-(1,3-propanediol 1-isopentene-1,1-dicarboxylate) (PPDIDC) (0.616 g) was mixed with AAMTCP (0.486 g) and then with DBU (0.026 g) in the presence of 1-methoxy-2-propanol (0.311 g). The polymer mixture (non-volatile content 78% w/w) was cast as a film and allowed to cure at ambient temperature. Gelation occurred 2 minutes after complete mixing and the film was tack-free after 50 minutes. Crosslinked polymer film properties are given in Table 4 [System PPDIDC/AAMTCP (DBU)].

Similar quantities of oligomer and crosslinker were mixed together and then with tri-n-butylamine (0.055 g) in the presence of 1-methoxy-2-propanol (0.3375 g). The polymer mixture (non-volatile content 77% w/w) was cast as a film and allowed to cure at ambient temperature. Gelation occurred 10 minutes after complete mixing, and the film was tack-free overnight. Crosslinked polymer film properties are given in Table 4 [System PPDIDC/AAMTCP (TBA)].

EXAMPLE 21

1-Acetoacetamido-3-acetoacetamidomethyl-3,5,5-trimethylcyclohexane

To isophoronediamine (139.24 g, 0.819 mol) in xylene (525 ml) at 120° C. was added with stirring 2,2,6-trimethyl-1,3-dioxen-4-one (232.51 g, 1.637 mol) in xylene (525 ml) over 10 minutes, during which the temperature decreased to 103° C. Vigorous effervescence and distillation of acetone (through a Vigreux column) immediately commenced. Pot temperature was increased to 120° C. over 15 minutes, and to 139° C. over a further 30 minutes, with collection of acetone distillate. After cooling to 58° C., supernatant solution was separated from deposited gum, which was dissolved in dichloromethane. Removal of solvent from combined solutions and drying (91° C./100 Pa) gave 1-acetoacetamido-3-acetoacetamidomethyl-3,5,5-trimethylcyclohexane (270.21 g, 98%), (AAMTCH), which was crushed to a light yellow powder, mp 144–147° C. (mixture of E and Z isomers), and identified by $^1$H-NMR, $^{13}$C-NMR, FT-IR and Raman spectra.

PPDSDC (0.757 g) was mixed with AAMTCH (0.507 g) and then with DBU (0.026 g) in the presence of 1-methoxy-2-propanol (0.527 g). The polymer mixture (non-volatile content 71% w/w) was cast as a film and allowed to cure at ambient temperature. Gelation occurred 5 minutes after complete mixing, and the film was tack-free after 15 minutes. Crosslinked polymer film properties are given in Table 4 [System PPDSDC/AAMTCH (DBU)].

Similar quantities of oligmer and crosslinker were mixed together, and then with tri-n-butylamine (0.057 g) in the presence of 1-methoxy-2-propanol (0.556 g). The polymer mixture (non-volatile content 70% w/w) was cast as a film and allowed to cure at ambient temperature. Gelation occurred 5 minutes after complete mixing, and the film was tack-free overnight (20 hours). Crosslinked polymer film properties are given in Table 4 [System PPDSDC/AAMTCH (TBA)].

By comparison, an acetoacetate such as neopentyl glycol bis(acetoacetate) will not cure a Michael acceptor at ambient temperature using tributylamine as catalyst.

EXAMPLE 22

N,N'Bis(acetoacetyl)-2-methylpiperazine

To 2-methylpiperazine (81.90 g, 0.819 mol) in xylene (525 ml) at 133° C. was added with stirring 2,2,6-trimethyl- 1,3-dioxen-4-one (232.48 g, 1.637 mol) in xylene (525 ml) over 10 minutes, during which the temperature decreased to 100° C. After heating to 115° C over 5 minutes vigorous effervescence commenced, and after heating to 124° C. over another 5 minutes distillation of acetone (through a Vigreux column) also commenced. Pot temperature was increased to 139° C. over a further 30 minutes, with collection of acetone distillate. After cooling to 20° C. overnight, supernatant liquid was separated from deposited syrup, which was dissolved in dichloromethane. Removal of solvent from combined solutions and drying (92° C./100 Pa) gave N,N'-bis(acetoacetyl)-2-methylpiperazine (BAAMPZ) as a viscous syrup (216.66 g, 99%), identified by $^1$H-NMR, $^{13}$C-NMR, FT-IR and Raman spectra.

PPDSDC (0.757 g) was mixed with BAAMPZ (0.403 g) and then with DBU (0.028 g) in the presence of 1-methoxy-2-propanol (0.1945 g). The polymer mixture (non-volatile content 86% w/w) was cast as a film and allowed to cure at ambient temperature. Gelation occurred 5 minutes after complete mixing, and the film was tack-free after 30 minutes. Crosslinked polymer film properties are given in Table 4 [System PPDSDC/BAAMPZ (DBU)].

EXAMPLE 23

N,N'-Bis(acetoacetyl)-1,4-diazacycloheptane

To 1,4-diazacycloheptane (81.90 g, 0.819 mol) in xylene (525 ml) at 122° C. was added with stirring 2,2,6-trimethyl-1,3-dioxen-4-one (232.49 g, 1.637 mol) in xylene (525 ml) over 10 minutes, during which the temperature decreased to 99° C. After heating to 124° C. over 5 minutes vigorous effervescence commenced, and after heating to 127° C. over 5 minutes distillation of acetone (through a Vigreux column) also commenced. Pot temperature was increased to 140° C. over a further 30 minutes, with collection of acetone distillate. After cooling to 15° C. overnight, supernatant liquid was separated from deposited syrup, which was dissolved in dichloromethane. Removal of solvent from combined solutions and drying (91° C./100 Pa) gave N,N'-bis(acetoacetyl)-1,4-diazacycloheptane (BAADCH) as a viscous syrup (211.16 g, 96%), identified by $^1$H-NMR, $^{13}$C-NMR, FT-IR and Raman spectra.

BAADCH was cured with PPDSDC under the same conditions as described in Example 22. A tack-free film was formed after about an hour.

EXAMPLE 24

1-(1-Ethoxycarbonyl-2-prop-1-enylamino)-2-(1-ethoxycarbonyl-2-prop-1-enylaminomethyl)-3,3,5-trimethylcyclopentane To 5-amino-2,2,4-trimethylcyclopentylmethylamine (127.76 g, 0.819 mol) in methanol (700 ml) was slowly added with stirring ethyl acetoacetate (215.85 g, 1.660 mol) in methanol (700 ml) over 35 minutes, during which the temperature increased from 22° C. to 31° C. The reaction mixture was allowed to stand at 21° C. overnight (17 h). Further methanol was added, and removal of solvent and drying (91°/100 Pa) gave 1-(1-ethoxycarbonyl-2-prop-1-enylamino)-2-(1-ethoxycarbonyl-2-prop-1-enylaminomethyl)-3,3,5-trimethylcyclopentane (EEMTCP, formula shown below) as a clear light yellow pourable viscous oil (296.54 g, 95%) identified by $^1$H-NMR, $^{13}$C-NMR, FT-IR and Raman spectra.

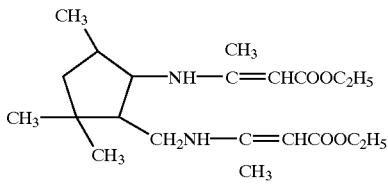

A mixture of EEMTCP and PPDIDC cured to a tack-free film within 48 hours even without catalyst.

EXAMPLE 25

1-(1-Isobutoxycarbonyl-2-prop-1-enylamino)-3-(1-isobutoxycarbonyl-2-prop-1-enylaminomethyl)-3,5,5-trimethylcyclohexane To isophoronediamine (139.23 g, 0.819 mol) in methanol (700 ml) was slowly added with stirring isobutyl acetoacetate (262.31 g, 1.660 mol) in methanol (700 ml) over 45 minutes, during which the temperature increased from 22° C. to 30° C. The reaction mixture was allowed to stand at 21° C. overnight (15 h). Further methanol was added, and removal of solvent and drying (91° C./100 Pa) gave 1-(1-isobutoxycarbonyl-2-prop-1-enylamino)-3-(1-isobutoxycarbonyl-2-prop-1-enylaminomethyl)-3,5,5-trimethylcyclohexane (IIMTCH) as a clear light yellow viscous syrup (366.80 g, 100%), which set to a soft gum on standing and was identified by $^1$H-NMR, $^{13}$C-NMR, FT-IR and Raman spectra.

PPDIDC (0.6165 g) was mixed with IIMTCH (0.6745 g) in the presence of 1-methoxy-2-propanol (0.075 g). The polymer mixture (non-volatile content 95% w/w) was cast as a film and allowed to cure at ambient temperature. Gelation occurred 30 minutes after complete mixing, and the film was tack-free after 24 hours. Crosslinked polymer film properties are given in Table 4 [System PPDIDC/IIMTCH].

Similar quantities of oligomer and crosslinker were mixed together, and then with triphenylphosphine (0.079 g), in the presence of toluene (0.184 g) and 1-methoxy-2-propanol (0.0759). The polymer mixture (non-volatile content 84% w/w) was cast as a film and allowed to cure at ambient temperature. Gelation occurred 45 minutes after complete mixing, and the film was tack-free after 24 hours. Crosslinked polymer film properties are given in Table 4 [System PPDIDC/IIMTCH (TPP)].

EXAMPLE 26

1-(1-ethoxycarbonyl-2-pent-1-enylamino)-3-(1-ethoxycarbonyl-2-pent-1-enylaminomethyl)-3,5,5-trimethylcyclohexane To isophoronediamine (139.23 g, 0.819 mol) in methanol (700 ml) was slowly added with stirring ethyl butyroacetate (262.32 g, 1.660 mol) in methanol (700 ml) over 45 minutes, during which the temperature decreased slightly from 24° C. to 23° C. The reaction mixture was allowed to stand at 22° C. overnight (16 h). Further methanol was added, and removal of solvent and drying (91° C./100 Pa) gave 1-(1-ethoxycarbonyl-2-pent-1-enylamino)-3-(1-ethoxycarbonyl-2-pent-1-enylaminomethyl)-3,5,5-trimethylcyclohexane (EEMTCH formula shown below) as a clear light yellow pourable syrup (356.74 g, 97%), identified by $^1$H-NMR, $^{13}$C-NMR, FT-IR and Raman spectra.

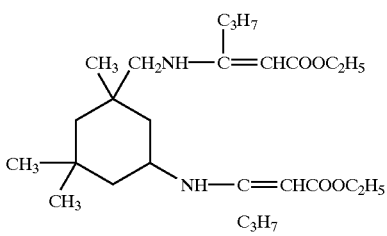

PPDIDC and EEMTCH were cured without catalyst under the conditions described in Example 25 and formed a tack-free film in 48 hours.

EXAMPLE 27

Curing of Poly-(1,3-propanediol 1-isopentene-1,1-dicarboxylate) with 1,1,1-Trimethylolpropane Tris-[β-(2-ethylhexylamino)crotonate] Generated in situ 1,1,1-Trimethylolpropane tris(acetoacetate) (0.387 g) was mixed with 2-ethylhexylamine (0.386 g) and then with PPDIDC (0.616 g). The polymer mixture (non-volatile content 100% w/w) was cast as a film and allowed to cure at ambient temperature. Gelation occurred overnight (15 hours) and the film was tack-free after 72 hours. Crosslinked polymer film properties are given in Table 4 [System PPDIDC/TMPTAA/EHA].

EXAMPLE 28

Dimethyl 3,14-Dioxo-5,12-dithia-1,16-hexadecanedioate

To methyl gamma-chloroacetoacetate (199.72 g, 1.327 mol) in isopropanol (350 ml) at 20° C. was added with stirring, 1,6-hexanedithiol (98.75 g, 0.658 mol) in isopropanol (350 ml) over 5 minutes, followed by isopropanol washings (270 ml) over a further 5 minutes. To the resulting solution at 22° C. was added dropwise sodium hydroxide (52.55 g, 1.314 mol) in methanol (650 ml) over 60 minutes, during which the temperature increased to 31° C., followed by addition at 30° C. of methanol washings (80 ml) over 5 minutes. The milky suspension was stirred at 27° C. for another 60 minutes, and then allowed to stand at 21° C. overnight (16 hours) The suspension was again stirred at 21° C. for 3 hours, during which complete reaction was confirmed by thin-layer chromatography. Water was added to give a two-phase liquid mixture, which was extracted with dichloromethane, and the combined organic phases were dried ($Na_2SO_4$). Removal of solvent and drying (86° C./100 Pa) gave dimethyl 3,14-dioxo-5,12-dithia-1,16-hexadecanedioate $CH_3OOCCH_2COCH_2S(CH_2)_6SCH_2COCH_2COOCH_3$ as a mobile oil (248.55 g, yield 100%, purity 99% by NMR).

1,10-Bis-(1-phenyl-5-oxo-3-pyrazolinyl)-2,9-dithiadecane

To dimethyl 3,14-dioxo-5,12-dithia-1,16-hexadecanedioate (209.58 g, 0.554 mol) in methanol (850 ml) at 20° C. was added with stirring phenylhydrazine (124.00 g, 1.148mol) in isopropanol (510 ml) over 15 minutes, during which the temperature increased to 39° C. The reaction mixture was heated to 60° C. over 25 minutes and maintained at 63° C. for a further 90 minutes. After cooling to 20° C. overnight (17.5 hours), much solid had crystallised from solution. The reaction mixture was stirred at 21° C. for 4.5 hours, and the thick suspension was then filtered to separate solid. The solid was washed with methanol/isopropanol (280:170 v/v, 2×450 ml) until washings were virtually colourless, sucked dry on a filter, and then dried under vacuum to constant weight, to give 1,10-bis-(1-phenyl-5-oxo-3-pyrazolinyl)-2,9-dithiadecane (BPOPDD) (formula shown below) (199.26 g, 73%) as a pale brown powder, mp 136–137° C., identified by $^1$H-NMR, $^{13}$C-NMR FT-IR and Raman spectra.

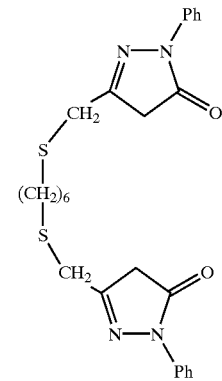

PPDSDC (0.504 g) was mixed with BPOPDD (0.494 g) and then with tri-n-butylamine (0.037 g) in the presence of cyclohexanone (0.741 g) and 1-methoxy-2-propanol (0.213 g). The polymer mixture (non-volatile content 52% w/w) was cast as a film and cured at either 17° C. (gel time 25 minutes) or 89° C. (tack-free time 15 minutes). Crosslinked polymer film properties are given in Table 4 [System PPDSDC/BPOPDD (TBA)].

Similar quantities of oligomer and crosslinker were mixed together, and then with DBU (0.019 g) in the presence of cyclohexanone (0.741 g) and 1-methoxy-2-propanol (0.202 g). The polymer mixture (non-volatile content 52% w/w) was cast as a film and cured at either 17° C. (gel time 30 minutes) or 89° C. (tack-free time 15 minutes). Crosslinked polymer film properties are given in Table 4. [System PPDSDC/BPOPDD (DBU)].

EXAMPLE 29

PPDSDC (0.757 g) was mixed with a solution of BPOPDD (0.106 g) in Trimethylolpropane Tris (acetoacetate) (TMPTAA, 0.331 g), and then with DBU (0.028 g) in the presence of 1-methoxy-2-propanol (0.196 g). The polymer mixture (non-volatile content 86% w/w) was cast as a film and cured at ambient temperature (gel time 20 minutes). Crosslinked polymer film properties are given in Table 4 [System PPDSDC/BPOPDD/TMPTAA (DBU)].

EXAMPLE 30

Poly-[(hydrogenated linoleic dimer acid)-co-(3,4-epoxycyclohexylmethyl 3,4-epoxycyclohexanecarboxylate)](2:3) bis-[p-(3-methyl-5-oxo-1-pyrazolinyl) benzoate]

To a stirred mobile slurry of p-(3-methyl-5-oxo-1-pyrazolinyl)-benzoic acid(24.2 g, 0.111 mol) in hydrogenated linoleic dimer acid (62.59 g, 0.111 mol) and 3,4-epoxycyclohexylmethyl 3,4-epoxycyclohexanecarboxylate (41.96 g, 0.167 mol) at 22° C. under nitrogen was added benzyltrimethylammonium hydroxide in methanol (40% w/w, 4.171 g 9.99 mmol, 3.00 mol %), followed after 5 minutes by addition at 23° C. of xylene washings (7.5 ml). The reaction mixture was heated to 125° C. over 15 minutes and maintained at 122° C. for 5 hours, changing from suspension to opaque viscous liquid. After cooling to 37° C., dichloromethane was added, the viscous solution was washed with water, the aqueous phase was washed with dichloromethane, and the combined dichloromethane phases were dried ($Na_2SO_4$). Removal of solvent and drying (91° C./100 Pa) gave poly-[(hydrogenated linoleic dimer acid)-co-(3,4-epoxycyclohexylmethyl 3,4-epoxycyclohexanecarboxylate)] (2:3) bis-[p-(3-methyl-5-oxo-1-pyrazolinyl)benzoate] (PDEBPB) as a clear hard glassy gum (111.99 g, 87%), identified by $^1$H-NMR, $^{13}$C-

The polymer mixture (non-volatile content 72% w/w) was cast as a film and cured at ambient temperature (gel time 2 minutes). Crossliked polymer film properties are given in Table 4 [System PPDIDC/PDEBPB(TBA)].

Similar quantities of PPDIDC and PDEBPB were mixed together, and then with DBU (0.010 g) in the presence of ethyl acetate (0.497 g) and 1-methoxy-2-propanol (0.039 g). The polymer mixture (non-volatile content 72% w/w) was cast as a film and cured at ambient temperature (gel time 2 minutes). Crosslinked polymer film properties are given in Table 4 [System PPDIDC/PDEBPB(DBU)].

Film Properties of Cured Polyester Olefin/Carbon Nucleophile Systems

| Example No. | System | Gloss Units (aluminum substrate) 20° | 60° | Gloss Units (PTFE substrate) 20° | 60° | Tg ° C. DSC | DMA |
|---|---|---|---|---|---|---|---|
| 9 | PPDSDC/NPGBAA (DBU) | 38 | 98 | — | — | 10 | — |
| 19 | PPDSDC/AAMTCP (DBU) | 23 | 65 | 82 | 96 | 3 | 32 |
| 20 | PPDIDC/AAMTCP (DBU) | 31 | 85 | 76 | 91 | -2 | 33 |
| 20 | PPDIDC/AAMTCP (TBA) | 21 | 54 | 39 | 69 | -29 | — |
| 21 | PPDSDC/AAMTCH (DBU) | 47 | 105 | 64 | 94 | 28 | 58 |
| 21 | PPDSDC/AAMTCH (TBA) | 26 | 74 | 83 | 94 | -3 | — |
| 22 | PPDSDC/BAAMPZ (DBU) | 27 | 60 | 87 | 96 | 18 | 57 |
| 25 | PPDIDC/IIMTCH | 85 | 137 | 81 | 87 | 32 | — |
| 25 | PPDIDC/IIMTCH (TPP) | 75 | 122 | 60 | 89 | 28 | 39 |
| 27 | PPDIDC/TMPTAA/EHA | 61 | 112 | 62 | 83 | -13 | 15 |
| 28 | PPDSDC/BPOPDD (DBU) | 35 | 92 | — | — | -3 | — |
| 28 | PPDSDC/BPOPDD (TBA) | 81 | 114 | — | — | -7 | — |
| 29 | PPDSDC/BPOPDD/TMPTAA (DBU) | 19 | 63 | — | — | — | — |
| 30 | PPDSDC/PDEBPB (DBU) | 27 | 68 | — | — | 5 | — |
| 30 | PPDSDC/PDEBPB (TBA) | 23 | 55 | — | — | 10 | — |
| 31 | PPDIDC/PDEBPB (DBU | 21 | 63 | — | — | 10 | — |
| 31 | PPDIDC/PDEBPB (TBA) | 14 | 54 | — | — | 10 | — |

NMR, FT-IR and Raman spectra. This was a polyester having terminal

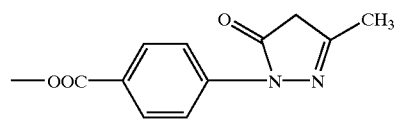

groups.

PPDSDC (0.252 g) was mixed with PDEBPB (1.160 g) and then with tri-n-butylamine (0.019 g) in the presence of ethylacetate (0.497 g) and 1-methoxy-2-propanol (0.073 g). The polymer mixture (non-volatile content 72% w/w) was cast as a film, and cured at ambient temperature (gel time 2 minutes). Crosslinked polymer film properties are given in Table 4 [System PPDSDC/PDEBPB (TBA)]

Similar quantities of PPDSDC and PDEBPB were mixed together, and then with DBU (0.0095 g) in the presence of ethyl acetate (0.497 g) and 1-methoxy-2-propanol (0.066 g) The polymer mixture (non-volatile content 72% w/w) was cast as a film and cured at ambient temperature (gel time 2 minutes). Crosslinked polymer film properties are given in Table 4 [System PPDSDC/PDEBPB (DBU)].

EXAMPLE 31

PPDIDC (0.206 g) was mixed with PDEBPB (1.160 g) and then with tri-n-butylamine (0.019 g) in the presence of ethyl acetate (0.497 g) and 1-methoxy-2-propanol (0.044 g).

I claim:

1. A coating, containing adhesive or sealant composition curable by Michael reaction comprising (A) a Michael acceptor which is a compound or polymer containing at least two activated olefinic double bonds and (B) a Michael donor which is a compound or polymer containing at least two nucleophilic groups, characterized in that the Michael acceptor (A) is a compound or polymer having repeating units of the formula:

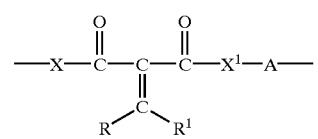

(I)

where

R is hydrogen or an alkyl or aryl group which is optionally substituted and $R^1$ is hydrogen or an alkyl group which is optionally substituted;

X and $X^1$ are each selected from an oxygen atom and a group of the formula $R^2$—N— where $R^2$ is a hydrogen or an alkyl or aryl group which is 20 optionally substituted; and A is a divalent organic group.

2. A coating, adhesive or sealant composition according to claim 1, characterised in that the Michael acceptor (A) is a polyester in which the groups X and $X^1$ represent oxygen atoms.

3. A coating, adhesive or sealant composition according to claim 1, characterised in that the Michael acceptor (A) is a polyamide in which the groups X and X¹ represent groups of the formula:

where R² is hydrogen or an alkyl group.

4. A coating, adhesive or sealant composition according to claim 1 characterised in that the nucleophilic groups of the Michael donor are selected from thiol groups, primary or secondary amine groups and active hydrogen groups of the formula Y—CH—Y¹, where Y and Y¹ are each selected from groups of the formula:

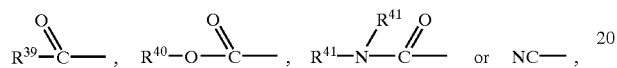

where $R^{39}$ and $R^{40}$ each represent an alkyl or aryl group and each group $R^{41}$ is a hydrogen atom or an alkyl group.

5. A coating, adhesive or sealant composition according to claim 4, characterised in that the nucleophilic groups of the electron donor (B) are beta-ketoamide groups of the formula:

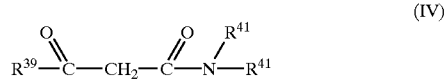

(IV)

6. A coating, adhesive or sealant composition according to claim 1, containing a tertiary amine catalyst, characterised in that the catalyst is a sterically hindered tertiary amine capable of acting as a light stabiliser.

* * * * *